(12) United States Patent
Pelletier et al.

(10) Patent No.: US 8,189,586 B2
(45) Date of Patent: May 29, 2012

(54) PLURAL TELECOMMUNICATIONS FUNCTIONS HAVING SHARING TRANSACTION(S)

(75) Inventors: Ghyslain Pelletier, Boden (SE); Krister Svanbro, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 695 days.

(21) Appl. No.: 11/733,558

(22) Filed: Apr. 10, 2007

(65) Prior Publication Data
US 2007/0242683 A1    Oct. 18, 2007

Related U.S. Application Data

(60) Provisional application No. 60/744,716, filed on Apr. 12, 2006, provisional application No. 60/744,719, filed on Apr. 12, 2006, provisional application No. 60/744,721, filed on Apr. 12, 2006, provisional application No. 60/744,724, filed on Apr. 12, 2006.

(51) Int. Cl.
*H04L 12/28* (2006.01)
*H04L 12/56* (2006.01)

(52) U.S. Cl. ........ 370/392; 370/389; 370/401; 370/474; 370/476; 370/477; 370/521; 713/160

(58) Field of Classification Search .................. None
See application file for complete search history.

(56) References Cited

U.S. PATENT DOCUMENTS

| | | | |
|---|---|---|---|
| 6,154,542 A * | 11/2000 | Crandall | ............... 380/28 |
| 7,164,665 B2 | 1/2007 | Tourunen | |
| 7,216,230 B2 | 5/2007 | Suzuki et al. | |
| 2002/0019933 A1 | 2/2002 | Friedman et al. | |
| 2002/0023143 A1 | 2/2002 | Stephenson et al. | |
| 2002/0044552 A1* | 4/2002 | Vialen et al. | ............... 370/389 |
| 2003/0009663 A1* | 1/2003 | Pelletier et al. | ............... 713/160 |
| 2003/0156218 A1* | 8/2003 | Laksono | ............... 348/388.1 |
| 2003/0167394 A1 | 9/2003 | Suzuki et al. | |
| 2004/0008632 A1 | 1/2004 | Hsu et al. | |
| 2004/0103277 A1 | 5/2004 | Seada | |
| 2004/0250095 A1 | 12/2004 | Feldman | |
| 2006/0206547 A1 | 9/2006 | Kulkarni et al. | |
| 2007/0155390 A1* | 7/2007 | Kodikara Patabandi et al. | ............... 455/450 |

FOREIGN PATENT DOCUMENTS

| | | |
|---|---|---|
| JP | 2002-319936 A | 10/2002 |
| WO | 9931843 A1 | 6/1999 |
| WO | 0207323 A2 | 1/2002 |

(Continued)

OTHER PUBLICATIONS

Jonsson et al. The RObust Header Compression (ROHC) Framework. <draft-ietf-rohc-rfc3095bis-framework-01.txt>. Jun. 2005.*

(Continued)

*Primary Examiner* — Jae Y Lee
(74) *Attorney, Agent, or Firm* — Nixon & Vanderhye, P.C.

(57) ABSTRACT

A node of a telecommunications network comprises a first function configured to perform a first operation on a first portion of a packet handled by the node and a second function configured to perform a second operation on a second portion of the packet. The first function and the second function are configured to employ a shared transaction for operating on the packet whereby, by virtue of the shared transaction, after performance of the first operation and the second operation, the packet has less overhead attributable to the first function and the second function than if the shared transaction had not been employed in performance of the first operation and the second operation.

38 Claims, 28 Drawing Sheets

FOREIGN PATENT DOCUMENTS

WO 03005675 A1 1/2003

OTHER PUBLICATIONS

Jacobson, *Compressing TCP/IP Headers for Low-Speed Serial Links*, IETF RFC 1144, IETF Network Working Group, Feb. 1990.

Degermark et al; *IP Header Compression*, IETF RFC 2507, IETF Network Working Group, Feb. 1999.

Bormann, et al. *RObust Header Compression (ROHC): Framework and four profiles: RTP, UDP, ESP and uncompressed*. IETF RFC 3095, Apr. 2001.

Pereira, R., *IP Payload Compression Using DEFLATE*, IETF RFC 2394, Dec. 1998.

Friend, R. et al, *IP Payload Compression Using LZS*, IETF RFC 2395, Dec. 1998.

Price, R. et al., *Signalling Compression (SigComp)*, IETF RFC 3320, Jan. 2003.

Casner, et al, *Compressing IP/UDP/RTP Headers for Low-Speed Serial Links*; IETF RFC 2508, IETF Network Working Group, Feb. 1999.

Koren, T., Casner, S., Geevarghese, J., Thompson B. and P. Ruddy, *Enhanced Compressed RTP (CRTP) for Links with High Delay, Packet Loss and Reordering*, IETF RFC 3545, IETF Network Working Group, Jul. 2003.

Jonsson, L. and G. Pelletier, *RObust Header Compression (ROHC): A compression profile for IP*, IETF RFC 3843, Jun. 2004.

Pelletier, G., *RObust Header Compression (ROHC): Profiles for UDP-Lite*, IETF RFC 4019, Apr. 2005.

Pelletier, G., Sandlund, K. and L. Jonsson, *Robust Header Compression (ROHC): A Profile or TCP/IP*, Internet Draft (work in progress), <draft-ietf-rohc-tcp-11.txt>, Jan. 2006.

Baugher M. et al., *The Secure Real-time Transport Protocol (SRTP)*, IETF RFC 3711, Mar. 2004.

Pelletier et al, *The Robust Header Compression (ROHC) Framework*, Internet Draft (work in progress), <draft-ietf-rohc-rfc3095bis-framework-00.txt>, Dec. 2005.

3GPP TR 25.813, V0.6.0, *Evolved Universal Terrestrial Radio Access (E-UTRA) and Evolved Universal Terrestrial Radio Access Network (E-UTRAN); Radio interface protocol aspects*, Mar. 2006.

U.S. Appl. No. 11/733,561, Pelletier et al, filed Apr. 10, 2007, entitled "Binding/Combining of Plural Telecommunications Function".

International Search Report and Written Opinion mailed Oct. 4, 2007 in corresponding PCT application PCT/SE2007/050233.

Jonsson et al, "A ROHC Profile for IP", RFC 3843, Jun. 2004.

U.S. Office Action mailed Jun. 11, 2009 in related U.S. Appl. No. 11/733,561.

U.S. Final Office Action mailed Dec. 11, 2009 in U.S. Appl. No. 11/733,561.

Japanese Office Action mailed Jan. 16, 2012 in Japanese application 2009-505330.

\* cited by examiner

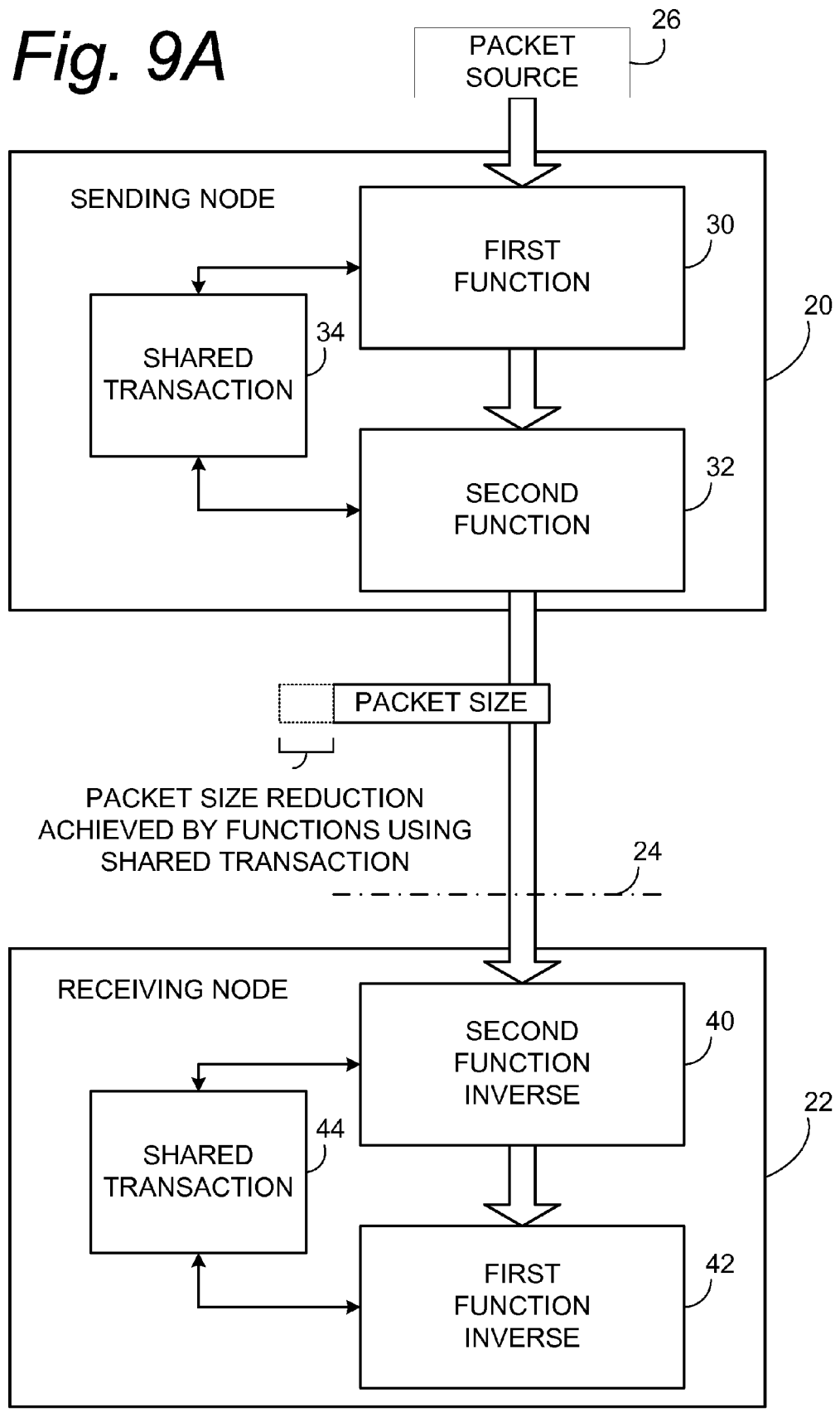

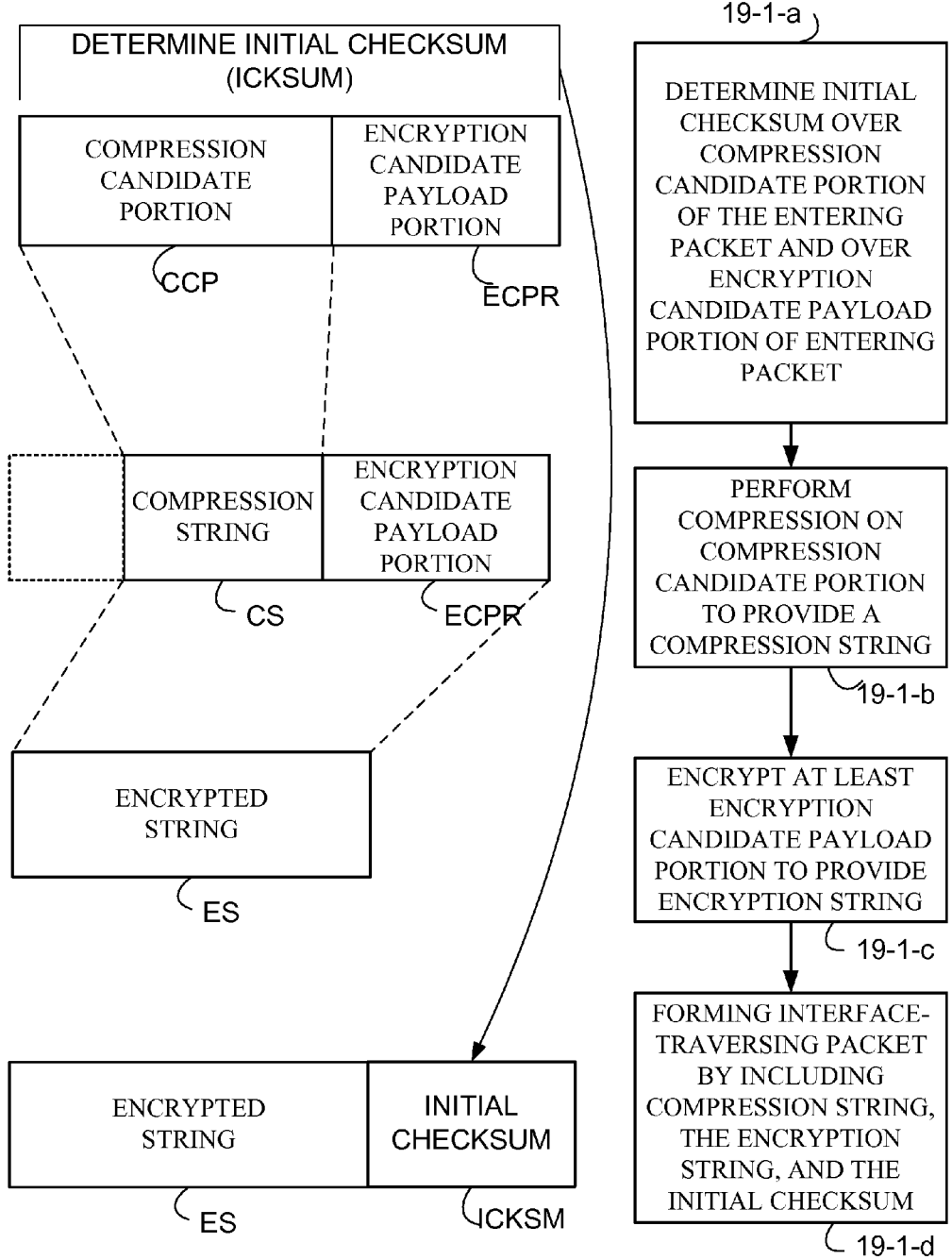

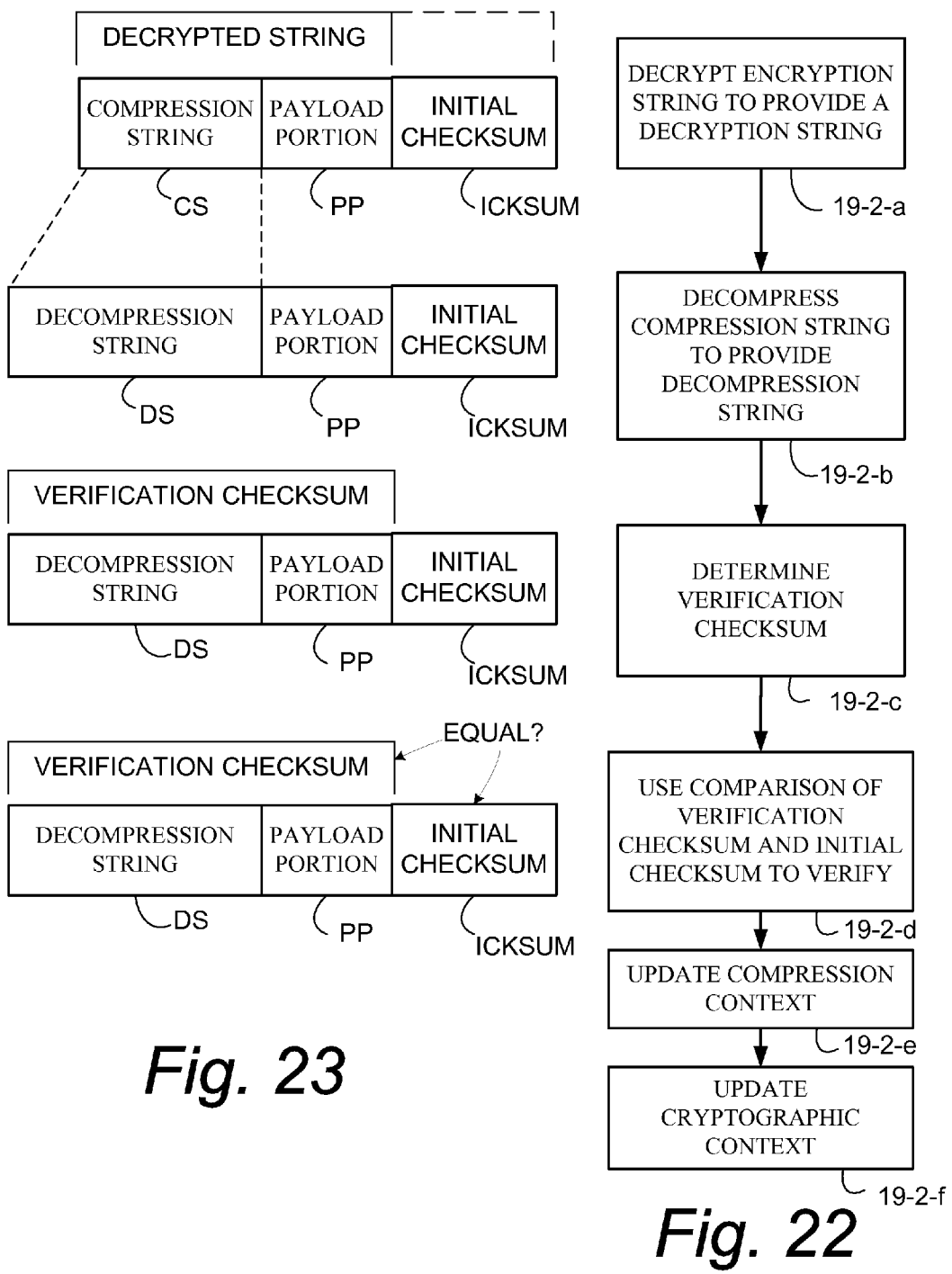

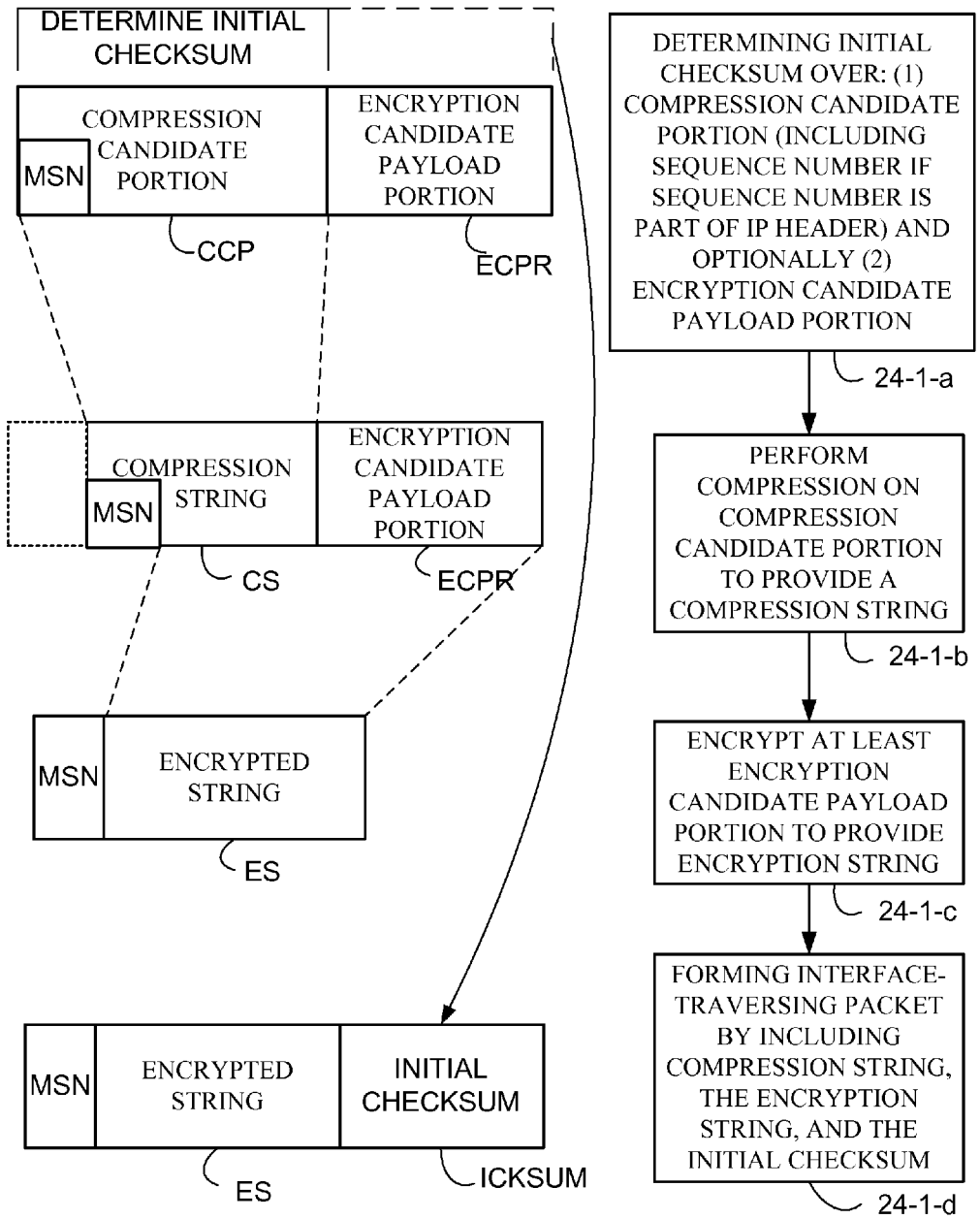

HC Algorithm with Encryption

Add functionality to HC algorithm:

The *main claim* is related to methods about how to apply encryption on entire packet, including most of the CO header except for channel-related information and maybe sequencing information (if used to derive cryptographic session key).

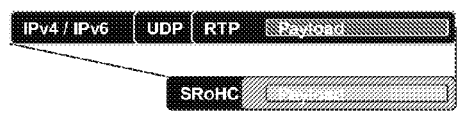

Fields that cannot be encrypted:

- multiplexing identifier    (e.g. RoHC CID)
- packet type identifier    (e.g. RoHC PT)
- the (possibly w-lsb bits of) MSN
- compression algorithm identifier
        (e.g. RoHC profile field in IR pkts.)

Example: general compressed header format (non-IR)

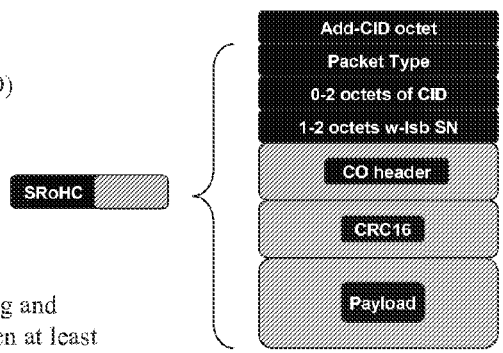

Additional functions / parameters for ciphering and reordering must be somehow provisioned when at least one such secure HC profile is negotiated.

*Fig. 33*

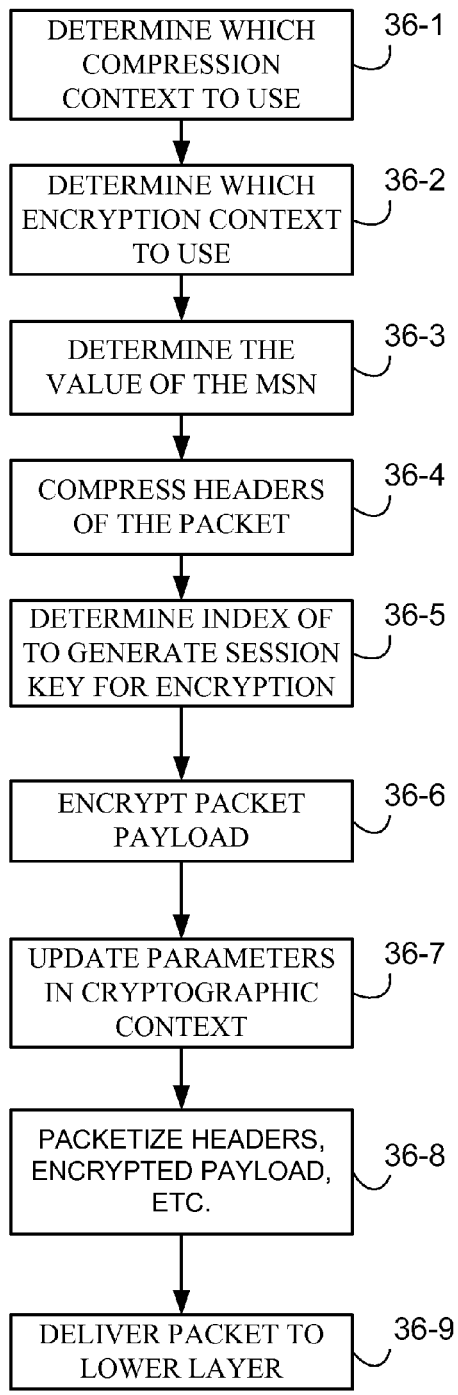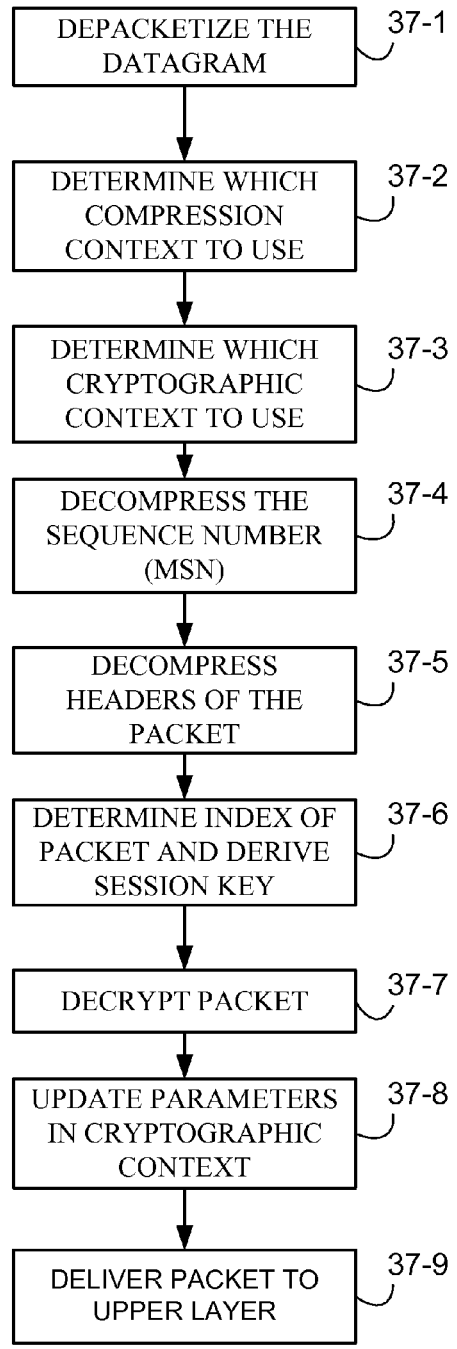
Fig. 36
Fig. 37

OSI Model

| Data unit | | Layer | Function |
|---|---|---|---|
| Host layers | Data | Application | Network process to application |
| | | Presentation | Data representation and encryption |
| | | Session | Interhost communication |
| | Segments | Transport | End-to-end connections and reliability (TCP) |
| Media layers | Packets | Network | Path determination and logical addressing (IP) |
| | Frames | Data link | Physical addressing (MAC & LLC) |
| | Bits | Physical | Media, signal and binary transmission |

*Fig. 38*
*PRIOR ART*

PLURAL TELECOMMUNICATIONS FUNCTIONS HAVING SHARING TRANSACTION(S)

This application claims the benefit and priority of the following United States Provisional Patent Applications, all of which are incorporated herein by reference in their entirety: (1) U.S. Provisional Patent Application 60/744,719, filed Apr. 12, 2006, entitled "METHODS FOR SHARED SEQUENCE NUMBERING AND CHECKSUMS BETWEEN MULTIPLE CO-LOCATED FUNCTIONS", (2) U.S. Provisional Patent Application 60/744,716, filed Apr. 12, 2006, entitled "METHODS FOR COMBINING CIPHERING AND COMPRESSION"; (3) U.S. Provisional Patent Application 60/744,721, filed Apr. 12, 2006, entitled "METHODS FOR COMBINED MANAGEMENT OF CRYPTOGRAPHIC AND COMPRESSION CONTEXTS"; and (4) U.S. Provisional Patent Application 60/744,724, filed Apr. 12, 2006, entitled "METHODS FOR SECURE ROBUST HEADER COMPRESSION". In addition, this application is related to simultaneously-filed U.S. patent application Ser. No. 11/733,561, entitled "BINDING/COMBINING OF PLURAL TELECOMMUNICATIONS FUNCTIONS", also incorporated herein by reference in its entirety.

BACKGROUND

I. Technical Field

This invention pertains to the handling of data packets in telecommunications, including but not limited to performance of operations such as encryption and compression of data packets in telecommunications.

II. Related Art and Other Considerations

Networking systems such as telecommunications systems are typically divided into layers. For example, the International Organization for Standardization (ISO) has developed an Open Systems Interconnection (OSI) networking model, also known as the OSI seven layer model and described in OSI 7498, which is incorporated herein by reference. The layers of the seven-layer OSI model (illustrated in FIG. 38) are as follows: (from bottom or first layer to top or seventh layer): physical layer; data link layer (or "link" layer); network layer; transport layer; session layer; presentation layer; and application layer. As used herein, a "model layer" is a layer comparable or analogous to a Model layer, regardless of whether specifications of/for the network employing such model layer explicitly refer to the OSI model or not. Within each model layer, the functionality(ies) of each layer may be implemented by one or more entities or functional units. In this sense, within each model layer there may be various functional layers, such as compression, encryption, and checksum functional layers, for example.

Due to the tremendous success of the Internet, it has become a challenging task to make use of the Internet Protocol (IP) over all kinds of links. IP protocols employ IP packets, the IP packets typically having a payload which carries the substantive user data, as well as a "header" usually appended at the beginning of the IP packet. The header generally carries information helpful for processing of the IP packet through one or more layers of the OSI model.

Because of the fact that the headers of the IP protocols are rather large, it is not always a simple task to use IP protocols for narrow band links, for example cellular links. As an example, consider ordinary speech data transported by the protocols (IP, UDP, RTP) used for Voice-over-IP (VoIP), where the header may represent about 70% of the packet-resulting in a very inefficient usage of the link.

A. Header Compression: Overview

Header compression is an important component to make IP services over wireless, such as voice and video services, economically feasible. The term header compression (HC) comprises the art of minimizing the necessary bandwidth for information carried in headers on a per-hop basis over point-to-point links. Header compression solutions have been developed by the Robust Header Compression (ROHC) Working Group of the IETF to improve the efficiency of such services.

Header compression techniques in general have a more than ten-year-old history within the Internet community; several commonly used protocols exist such as RFC 1144 [Van Jacobson, *Compressing TCP/IP Headers for Low-Speed Serial Links*, IETF RFC 1144, IETF Network Working Group, February 1990], RFC 2507 [Mikael Degermark, Björn Nordgren, Stephen Pink; *IP Header Compression*, IETF RFC 2507, IETF Network Working Group, February 1999]; and RFC 2508 [Steven Casner, Van Jacobson, *Compressing IP/UDP/RTP Headers for Low-Speed Serial Links*; IETF RFC 2508, IETF Network Working Group, February 1999], all of which are incorporated herein by reference.

Header compression takes advantage of the fact that some fields in the headers are not changing within a flow, or change with small and/or predictable values. Header compression schemes make use of these characteristics and send static information only initially, while changing fields are sent with their absolute values or as differences from packet to packet. Completely random information has to be sent without any compression at all.

Header compression is often characterized as an interaction between two state machines, one compressor machine and one decompressor machine, each maintaining some information related to flows being compressed in a context.

A compression context contains and maintains relevant information about past packets, and this information is used to compress and decompress subsequent packets. As explained in Carsten Bormann, et al. *RObust Header Compression (ROHC). Framework and four profiles. RTP, UDP, ESP and uncompressed.* IETF RFC 3095, April 2001 (incorporated herein by reference):

"The context of the compressor is the state it uses to compress a header. The context of the decompressor is the state it uses to decompress a header. Either of these or the two in combination are usually referred to as "context", when it is clear which is intended. The context contains relevant information from previous headers in the packet stream, such as static fields and possible reference values for compression and decompression. Moreover, additional information describing the packet stream is also part of the context, for example information about how the IP Identifier field changes and the typical inter-packet increase in sequence numbers or timestamps."

A challenging task is to keep the compressor and decompressor states, called contexts, consistent with each other, while keeping the header overhead as low as possible. There is one state machine for the compressor, and one state machine for the decompressor. The compressor state machine directly impacts the level of compression efficiency, as it is an important part of the logic controlling the choice of compressed packet type to be sent; the purpose of the decompressor state machine is mainly to provide the logic for feedback (if applicable) and to identify the packet types for which decompression may be attempted.

A packet that provides the means for the decompressor to verify successful decompression is a context-updating packet. Because decompression can be verified, this type of packet can update the context. For ROHC, context-updating packet types carry a Cyclic Redundancy Code (CRC) within their format; this is a checksum calculated over the original uncompressed header. This CRC is used to verify successful decompression of each packet; when successful, the context can be updated.

A packet that relies on other means to guarantee successful decompression—i.e. a packet format does not provide the means for the decompressor to verify successful decompression, and that only carries the information necessary for the decompression itself, is a self-contained packet. These packets do not update the context.

Header compression is uses a Sequence Number to uniquely identify individual packets. Fields in header compression are normally compressed based on a function of the Sequence Number (SN). This SN number can be either derived from the protocol being compressed (e.g. RTP SN), or generated by the compressor. Within this document, such sequence number is referred to as the Master Sequence Number (MSN) when the distinction between both is irrelevant.

Early header compression profiles were designed with the assumption that the channel between the compressor and the decompressor will not reorder the header-compressed packets; the channel is required to maintain packet ordering for each compressed flow. This assumption was motivated because the channels initially considered as potential candidates to use ROHC did guarantee in-order delivery of packets; this assumption was useful to improve compression efficiency and the tolerance against packet loss, objectives that were ranked highest on the requirement list at the time.

RoHCv2 profiles currently being developed will handle out-of-order delivery between compression endpoints within the compression protocol and encoding methods itself, among other improvements.

A number of different types of compression can be used above the link layer. These include payload compression (see, e.g., Pereira, R., *IP Payload Compression Using DEFLATE*, IETF RFC 2394, December 1998; and Friend, R. et R. Monsour, *IPPayload Compression Using LZS*, IETF RFC 2395, December 1998, incorporated herein by reference), signaling compression (see, e.g., Price, R. et al., *Signalling Compression (SigComp)*, IETF RFC 3320, January 2003, incorporated herein by reference), header removal and regeneration, and header compression. Concerning header compression, see, e.g., Van Jacobson, *Compressing TCP/IP Headers for Low-Speed Serial Links*, IETF RFC 1144, IETF Network Working Group, February 1990; Mikael Degermark, Björn Nordgren, Stephen Pink; *IP Header Compression*, IETF RFC 2507, IETF Network Working Group, February 1999; Steven Casner, Van Jacobson, *Compressing IP/UDP/RTP Headers for Low-Speed Serial Links*; IETF RFC 2508, IETF Network Working Group, February 1999; Koren, T., Casner, S., Geevarghese, J., Thompson B. and P. Ruddy, *Enhanced Compressed RTP (CRTP) for Links with High Delay, Packet Loss and Reordering*, IETF RFC 3545, IETF Network Working Group, July 2003; Carsten Bormann, et al. *RObust Header Compression (ROHC). Framework and four profiles. RTP, UDP, ESP and uncompressed*. IETF RFC 3095, April 2001; Jonsson, L. and G. Pelletier, *RObust Header Compression (ROHC). A compression profile for IP*, IETF RFC 3843, June 2004; Pelletier, G., *RObust Header Compression (ROHC). Profiles for UDP-Lite*, IETF RFC 4019, April 2005; and Pelletier, G., Sandlund, K. and L. Jonsson, *Robust Header Compression (ROHC). A Profile or TCP/IP*, Internet Draft (work in progress), <draft-ietf-rohc-tcp-11.txt>, January 2006. All references listed in this paragraph are incorporated herein by reference. Any of these types of compression may be designed to make use of sequence numbers and checksums.

Other optimizations, such as other types of compression, can also be used to further increase the performance of bandwidth-limited systems.

B. Header Compression: Verification

Robust header compression uses a checksum (CRC) calculated over the compressed header (e.g. within initialization packets) or over the uncompressed header (e.g. in compressed packets). This is used to verify correct decompression at the decompressor. More specifically, as one example, header compression normally uses a checksum to verify the outcome of its decompression attempts. It can be a checksum calculated over the uncompressed state of the information being compressed, or it can be a checksum calculated over the information sent between compressor and decompressor, i.e. either of the compressed information, the uncompressed information or the compression protocol information, or any combination thereof.

Similarly, a Frame Checksum Sequence (FCS) is often used before the deciphering process, in order to ensure that no information delivered to the deciphering algorithm can lead to an incorrect ciphering context.

Undetected residual errors may lead to loss of synchronization to any of the functions discussed above, depending on the algorithm used.

A header compressor can use the secure reference principle to ensure that context synchronization between compressor and decompressor cannot be lost due to packet losses. The compressor obtains its confidence that the decompressor has successfully updated the context from a context-updating packet based on acknowledgements received by the decompressor. However, most packet types used with the secure reference principle are self-contained and thus not meant to update the context.

The compressor normally updates its compression context only after receiving acknowledgements from the decompressor for a context updating packet (identified using the MSN in the feedback message).

The decompressor normally updates its context after verifying the outcome of the decompression, using the cyclical redundancy check (CRC) carried within the compressed header (when present in the packet format, not always true when operating using the secure reference principle). Subject to rate limitation, the decompressor normally acknowledge the update to the compressor.

C. Security/Ciphering

The evolution and design using new architectural models tend to reduce the number of nodes involved in the transmission path, and to use openly standardized interfaces. This in turn modifies the traditional separation between functions, as well as creating new trust models with respect to security. While security is often seen in the Internet paradigm as an end-to-end function between communicating hosts, security mechanisms are often found in lower model layers to address low-level security issues.

In terms of security, encryption of packet data flows often requires the sender and the receiver to maintain cryptographic state information. This information is often referred to as a cryptographic context.

Cryptographic keys can be part of this context, e.g. one "session" key may be used directly by the cryptographic transform while another "master" key can be used to derive the session key. The master key is normally given by a key management protocol in a secure way. Other parameters found in the context are often e.g. an identifier for the encryption algorithm, indicators for the session, counters, length parameters for keys, etc. Many of these parameters are specific to the active cryptographic transform.

Some algorithms derive the session key to use for a packet based on the sequencing information associated with the packet. For example, Secure Real-Time Reference Protocol (SRTP) (see FIG. 1) derives an index for the packet based on the RTP sequence number carried within the packet. SRTP is an OSI application layer protocol, meant to provide an end-to-end security layer to real-time applications using the RTP/RTCP protocols, as illustrated in FIG. 2. SRTP is described, e.g., in Baugher M. et al., *The Secure Real-time Transport Protocol (SRTP)*, IETF RFC 3711, March 2004, incorporated herein by reference. It is herein acknowledged that there are limitations to the derivation of the key index, as the derivation of correct value and the updating of the cryptographic context is sensitive to larger packet reordering as well as to residual bit errors. While the amount of reordering mentioned is in the order of 2^15 packets and is not likely to occur, this highlights the possible impacts of undetected bit errors being presented to the security layer where an erroneous packet may mistakenly update the crypto context with an index in the wrong interval, and disrupt deciphering of subsequent packets.

These algorithms maintain this sequencing information as part of the cryptographic context, and the correct indexing and update to this information must thus be robust between ciphering endpoints. The exact correct sequencing must be known in order to use the correct deciphering key. As opposed to header compression with RoHC, most often the cryptographic context is updated without any form of verification of the success of the operation. This normally requires robust mechanisms to ensure that sequencing is maintained properly. Examples of such cryptographic transforms, and how they operate encryption or decryption once the session key is known, can be found in SRTP.

The ciphering function thus requires that the order in which the encrypted packets are received is the same as the order in which they were sent, or at least that this information can be derived, in order to pick the correct deciphering key. Otherwise, the ciphered data will not be correctly deciphered, and potentially the cryptographic context will become unsynchronized, thus propagating the errors to subsequent packets.

D: Compression: Synchronization

FIG. 3 shows a typical example of a compressor (upper part) and a decompressor (lower part) operating using the secure reference principle. Compressed packets are exchanged over time (Sequence axis), and the Secure Reference (SR) LSB sliding window is updated following specific events. Note that the sliding window may contain more than one value at certain moments, but there is always only one that is the secure reference used for compression and decompression of a specific field.

The objective of the compression peers is to always stay synchronized regarding what reference is used for the compression/decompression of a particular packet. In particular, the following applies and is reflected in the FIG. 3.

The decompressor can only verify the successful decompression of context-updating packets (packets that can update the secure reference).

The decompressor cannot verify the successful decompression of a self-contained packet (a packet that does not update the secure reference).

The compressor updates its sliding window of secure references when an acknowledgement is received from the decompressor. Previous reference(s) (acknowledged and/or unacknowledged) are removed from the window, and only the latest acknowledged one is kept as the secure reference.

The decompressor updates its sliding window of secure references when a packet is received for which the LSBs are less than earlier packets, indicating that it has been compressed with the reference that the decompressor has previously acknowledged. Only the latest reference for which an acknowledgement was sent is then kept as the secure reference.

According to the state of the art when using the "optimistic approach", the compressor always updates its context. This is because all packets that are sent contain a checksum calculated of the uncompressed header. This checksum is used by the decompressor to verify the outcome of the decompression process. When successful, the decompressor updates its context.

According to the state of the art for updating the cryptographic context, the cryptographic context normally gets updated with the highest sequence number seen when deciphering a packet, as well as with a roll-over counter and other parameters, for each packet that it processes. The cryptographic context update normally relies heavily on guarantees of in-order delivery, very low probability for residual bit errors when sequencing information and other ciphering is carried over a link; it normally has no means to verify the outcome of the deciphering process.

E. Radio Access Network: Overview

In a typical cellular radio system, wireless user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

The core network has two service domains, with an RNC having an interface to both of these domains. The Universal Mobile Telecommunications (UMTS) Terrestrial Radio Access Network (UTRAN) accommodates both circuit switched and packet switched connections. In this regard, in UTRAN the circuit switched connections involve a radio network controller (RNC) communicating with a mobile switching center (MSC), which in turn is connected to a connection-oriented, external core network, which may be (for example) the Public Switched Telephone Network (PSTN) and/or the Integrated Services Digital Network (ISDN). On the other hand, in UTRAN the packet switched connections involve the radio network controller communicating with a Serving GPRS Support Node (SGSN) which in turn is connected through a backbone network and a Gateway GPRS support node (GGSN) to packet-switched networks (e.g., the Internet, X.25 external networks).

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface".

FIG. 4 shows an example of a traditional architecture, here exemplified using the UTRAN architecture. Of particular interest in the UTRAN architecture is the traditional separation between functionalities into different nodes: the RNC handles sequencing when lossless relocation is supported (optional), thus adding an overhead for one sequence number. The ciphering occurs in the NodeB, and requires in-order delivery of each SDUs to maintain the ciphering context. In order to ensure that the ciphering does not loose synchronization, a L2 Frame Checksum Sequence (FCS) is normally used, adding additional octets for transmission over the air interface.

The Hybrid-ARQ mechanism requires reliable detection of bit error during transmission of individual blocks, as it must detect transmission failures for RLC PDU in order to request a retransmission. Thus, it is assumed that the rate of residual bit error rate (BER) after the H-ARQ is very low.

F. System Evolution: Overview

The Third Generation Partnership Project (3GPP) is also specifying the long-term evolution of third generation cellular systems to meet demands for, e.g., higher user bit rate. In September 2006, 3GPP finalized a study item called Evolved UTRA and UTRAN. The purpose of the study was to define the long-term evolution (LTE) of 3GPP access technology for the future. Also undertaken is a study for System Architecture Evolution (SAE) whose objective is development of a framework for an evolution or migration of the 3GPP system to a higher-data rate, lower-latency, packet-optimized system that supports multiple radio access technologies.

The evolved UTRAN comprises evolved base station nodes, e.g., evolved NodeBs or eNBs, providing the evolved UTRA U-plane and C-plane protocol terminations toward the user equipment unit (UE). As shown in FIG. 5, the eNB hosts the following functions: (1) functions for radio resource management (e.g., radio bearer control, radio admission control), connection mobility control, dynamic resource allocation (scheduling); (2) mobility management entity (MME) including, e.g., distribution of paging message to the eNBs; and (3) User Plane Entity (UPE), including IP Header Compression and encryption of user data streams; termination of U-plane packets for paging reasons, and switching of U-plane for support of UE mobility.

The eNBs are connected with each other by means of an X2 interface. The eNBs are also connected by means of an S1 interface to the Evolved Packet Core (EPC). The S1 interface supports a many-to-many relation between an access gateway (aGW) in the packet core and the eNBs. The S1 interface provides access to the Evolved RAN radio resources for the transport of user plane and control plane traffic. The S1 reference point enables MME and UPE separation and also deployments of a combined MME and UPE solution.

As seen in FIG. 5, of particular interest in the current proposal for the SAE/LTE architecture is the removal of the RNC. Removal of the RNC node results in the fact that the ciphering function and the PDCP function, which hosts the header compression function, are now located in the same node, e.g., in the aGW or in the eNB. Both the ciphering and the PDCP functions terminate into the User Equipment (UE) on the other end. In other words, the interface between the aGW node and the eNB node is deemed to be untrusted. Untrusted means that the eNB can be physically tampered with. The eNB is normally in a remote location, and if the eNB gets compromised, much user information could potentially be misappropriated. The S1 interface thus requires that ciphering be applied to the user traffic, and this propagates up to the UE. A secure tunnel over the S1 interface would not solve the problem of trust of the eNB node.

One issue with respect to reordering between ciphering and/or PDCP entities is that the S1 interface or the air interface (H-ARQ) may (when PDCP is in aGW) produce out-of-order packets. As ciphering requires correct sequencing information, additional overhead for sequencing must be maintained and transmitted over the air interface. In case lossless relocation is to be supported, additional sequencing overhead may be required in the PDCP as well.

FIG. 6 shows an example third party proposal with respect to the PDCP functions and SAE/LTE architecture. PDCP functions may also be located in the eNB in the SAE/LTE architecture, in which case the same issues apply there as well.

G. Multiple Independent Layers of Functionality

As indicated previously, within each model layer there may be a layering of functionality(ies) into separated, multiple independent functional layers. The creation of multiple functional layers within a model layer creates considerable overhead. Traditionally, this has been necessary as the functions where often separated into different physical nodes, as in the example of the evolved UTRAN (E-UTRAN) architecture briefly described above.

In view of the conventional layered technology, and with respect to model layer 2 ciphering and current E-UTRAN/SAE/LTE architecture, each layered function (such as ciphering) uses its own separate mechanism to maintain sequencing and perform encryption, possibly coupled with PDCP sequencing independently of other functions such as header compression. Detection of residual error above the H-ARQ protocol is often necessary, to ensure that correct cryptographic context is maintained; this is also independent of potential verification mechanism from other layers.

The state-of-the-art in terms of header compression is RoHC, Carsten Bormann, et al. *RObust Header Compression (ROHC). Framework and four profiles. RTP, UDP, ESP and uncompressed.* IETF RFC 3095, April 2001; Pelletier, G., Sandlund, K. and L. Jonsson, *The Robust Header Compression (ROHC) Framework*, Internet Draft (work in progress), <draft-ietf-rohc-rfc3095bis-framework-00.txt>, December 2005. RoHC currently uses its own sequence number and its own checksum. The same applies to state-of-the-art ciphering that relies on model layer 2 sequencing and checksums. RoHC does not currently handle reordering, although this is being addressed. In terms of the type of encryption that is of interest to this idea, SRTP is the state-of-the-art; however, it operates at the OSI application layer and not in combination with header compression.

In view of the conventional layered technology, ciphering uses its own separate mechanism to maintain sequencing, possibly coupled with PDCP sequencing independently of header compression, and where residual error detection above the H-ARQ protocol is required to ensure robust selection/derivation of the session key from the cryptographic context for the ciphering process, and is independent of the header compression function. Ciphering and header compression have always been handled independently of one another. One possible reason is that often some functions operate on the connection (e.g. ciphering, reordering), independently and unaware of the different flows they are processing and forwarding to other layers other than (possibly) common requirements from that layer itself (e.g. based on QoS requirements), as illustrated in example manner in FIG. 7.

FIG. 8 illustrates, in example fashion, a problem now addressed. Even in an LTE/SAE type system, the layering of functions even within a same node results in significant overhead. For the overhead of the lower layer, Table 1 below shows the layer 2 function and corresponding overhead (in octets).

TABLE 1

| Layer 2 FCS: | 3-4 octets (handles bit errors) |
| Layer 2 (ciphering): | 2 octets (reordering + ciphering key) |
| Layer 2 PDCP SN: | 2 octets (lossless relocation – PDCP SeqNum PDU) |
| Total overhead: | 7+ octets |

What is desired, therefore, and an object of the present invention, are one or more of a node, apparatus, system, method, or technique for reducing overhead associated with model layer 2 functions (e.g., link layer functions).

SUMMARY

A node of a telecommunications network comprises a first function configured to perform a first operation on a first portion of a packet handled by the node and a second function configured to perform a second operation on a second portion of the packet. The first function and the second function are configured to employ a shared transaction and/or shared service for operating on the packet whereby, by virtue of the shared transaction and/or shared service, after performance of the first operation and the second operation, the packet has less overhead attributable to the first function and the second function than if the shared transaction and/or shared service had not been employed in performance of the first operation and the second operation.

In an example implementation, the node is an access gateway of a System Architecture Evolution/Long Term Evolution (SAE/LTE) telecommunications network, and a link layer protocol configured to perform the first function, the second function, and the shared transaction and/or shared service.

In another example implementation, the node is an evolved node B (eNB) of a System Architecture Evolution/Long Term Evolution (SAE/LTE) telecommunications network, and a link layer protocol configured to perform the first function, the second function, and the shared transaction and/or shared service.

In an example implementation, the node is a mobile user equipment (UE) of a System Architecture Evolution/Long Term Evolution (SAE/LTE) telecommunications network, and a link layer protocol configured to perform the first function, the second function, and the shared transaction and/or shared service.

In one aspect of the technology, the shared transaction and/or shared service comprises shared information employed by the first function and the second function. For example, in one example implementation the first function is a data compression function and the second function is an encryption function, and the shared information is a sequence number originated by the compression function as a sequence number (MSN) for the compression function and the sequence number is also used by the encryption function to derive a session key for the encryption operation. In another example implementation, the first function is a data compression function and the second function is an encryption function, and the shared information is a sequence number originated by the encryption function from which a session key is derived and is also used by the compression function as a sequence number MSN.

In one aspect of the technology, the shared transaction and/or shared service comprises the second function also operating on the first portion of the packet. For example, in one example implementation, the first function is a data compression function and the second function is an encryption function, and the encryption function encrypts at least a portion of a header of the packet (but does not encrypt compression channel identifiers of the header).

In one aspect of the technology, the shared transaction and/or shared service comprises determination of a checksum over at least a part of the first portion of the packet and over at least a part of the second portion of the packet. In an example implementation, the first function is a data compression function, the first portion of the packet is a packet header, the second function is an encryption function, the second portion of the packet is a packet payload, and the checksum is determined over at least part of the header of the packet and over at least a part of the payload of the packet. In another example implementation, the shared transaction and/or shared service comprises determination of a checksum over at least a part of the first portion of the packet, and the part of the first portion of the packet over which the checksum is determined comprises a parameter utilized by the second function in operating on the second portion of the packet. For example, in an implementation wherein the second portion of the packet is a packet payload, the checksum is determined over at least part of the header of the packet, and the parameter utilized by the second function in operating on the second portion of the packet is a sequence number to derive a session key for its cryptographic context.

Thus, in view of the shared transaction and/or shared service and essentially combined or merged functionalities, method and apparatus are provided for sharing such transactions/information as sequencing information and checksum information between multiple functions operating in the same endpoints. The shared transaction and/or shared service technology is applicable to any two suitable sending and receiving nodes, whether adjacent or not, and is particularly but not exclusively suitable to situations or architectures wherein the link layer maintains and transports sequencing and/or checksum information on the behalf of a plurality of functions/processes which shares the same information. Moreover, the sending node in which the shared transaction and/or shared service technology is employed need not be a single node, but instead can comprise plural sending nodes over which the multiple functions may be distributed. Functions included in the technology can be, for example, any of header compression, header removal and regeneration, payload compression, signaling compression, encryption and reordering functions and any combination thereof.

Thus, as summarized above and further explained below, header compression and ciphering (and possibly other functions) can share the sequencing information and checksum, reducing overhead of having separate sequencing and checksums. The SAE/LTE architecture provides a candidate system for this idea to be applied within the Access Gateway (aGW), within the evolved Node B (eNB) and the User Equipment (UE).

The technology described herein also encompasses introduction of a security function (e.g., encryption) inside a header compression profile, based on the RoHC sequencing, and realizing such robustly and without overhead. For example, the technology encompasses binding the ciphering context management function to the existing mechanisms of the header compression context management for a profile. Further, the technology encompasses introduction of a security function (encryption AND authentication) to completely protect a header compression channel, based on RoHC and for all profiles on the channel. The technology also encompasses a relatively complete security solution for RoHC.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 9A is a diagrammatic view of a telecommunications network wherein in a first function and a second function of a node employ a generic shared transaction and/or shared service for reduction of packet overhead.

FIG. 20 is a flowchart showing example actions performed at a sending node in an example implementation of the first mode of FIG. 19.

FIG. 21 is a diagrammatic view showing packet depictions corresponding to the actions of FIG. 20.

FIG. 22 is a flowchart showing example actions performed at a receiving node in an example implementation of the first mode of FIG. 19.

FIG. 23 is a diagrammatic view showing packet depictions corresponding to the actions of FIG. 22.

FIG. 25 is a flowchart showing example actions performed at a sending node in an example implementation of the second mode of FIG. 24.

FIG. 26 is a diagrammatic view showing packet depictions corresponding to the actions of FIG. 25.

FIG. 33 shows an example embodiment based on RoHC.

FIG. 36 is a flowchart showing acts or events involved in a sending node having combined or merged compression and encryption processes wherein sequence numbers are shared.

FIG. 37 is a flowchart showing acts or events involved in a receiving node having combined or merged compression and encryption processes wherein sequence numbers are shared.

FIG. 38 is a diagrammatic view showing the seven layer OSI layer model.

DETAILED DESCRIPTION

Figure 1:
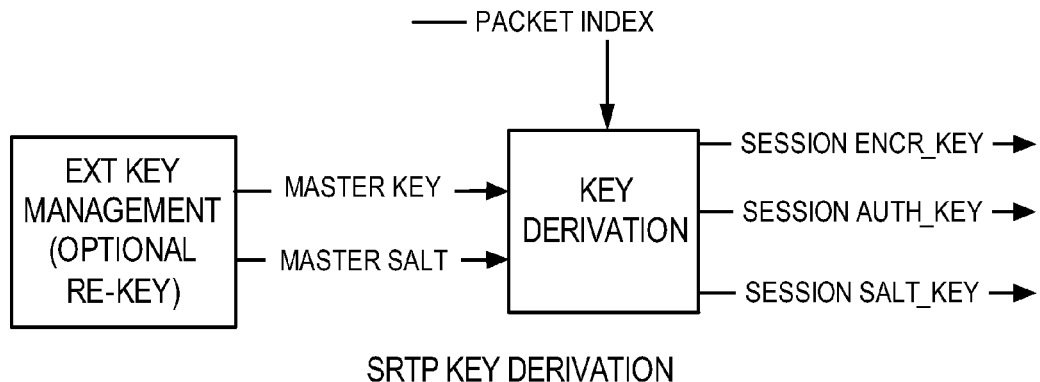
FIG. 1 is a diagrammatic view illustrating example derivation of a SRTP key.
Figure 2:
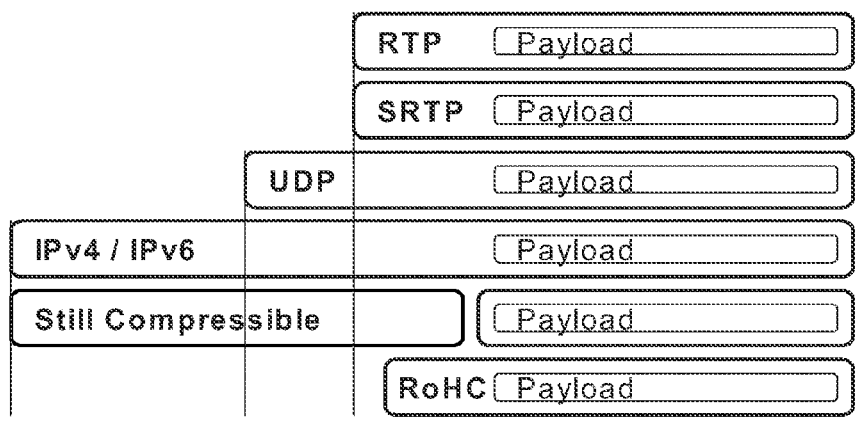
FIG. 2 is a diagrammatic view illustrating Secure Real Time Transport Protocol (SRTP).
Figure 3:
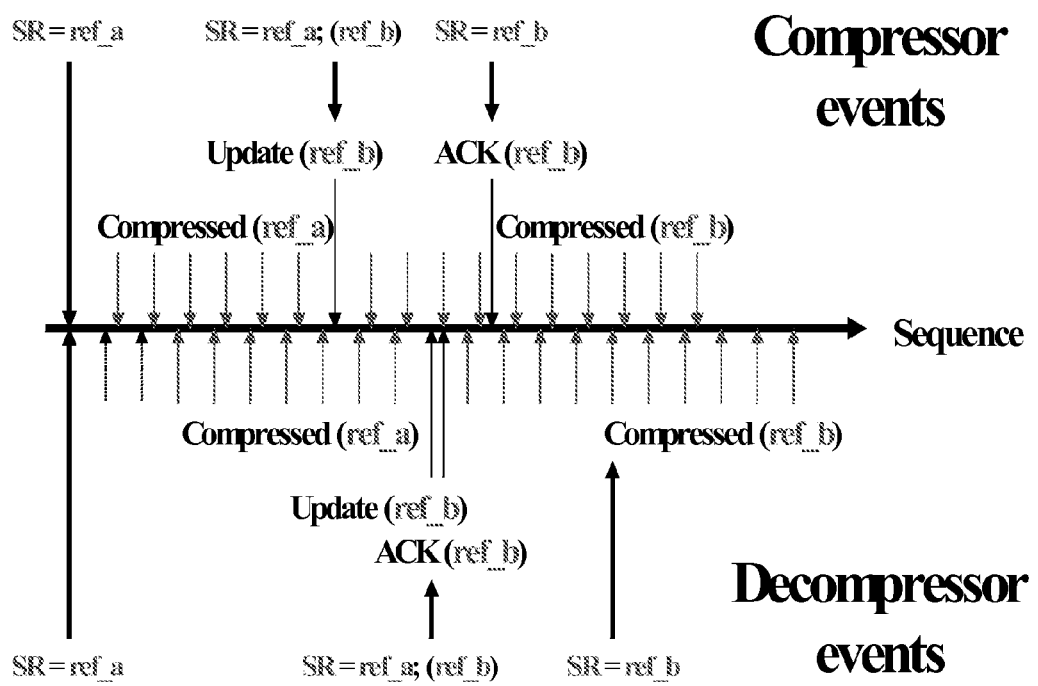
FIG. 3 is a diagrammatic view illustrating a particular problem involved in using the concrete example of the architecture defined in 3GPP TR 25.813.
Figure 4:
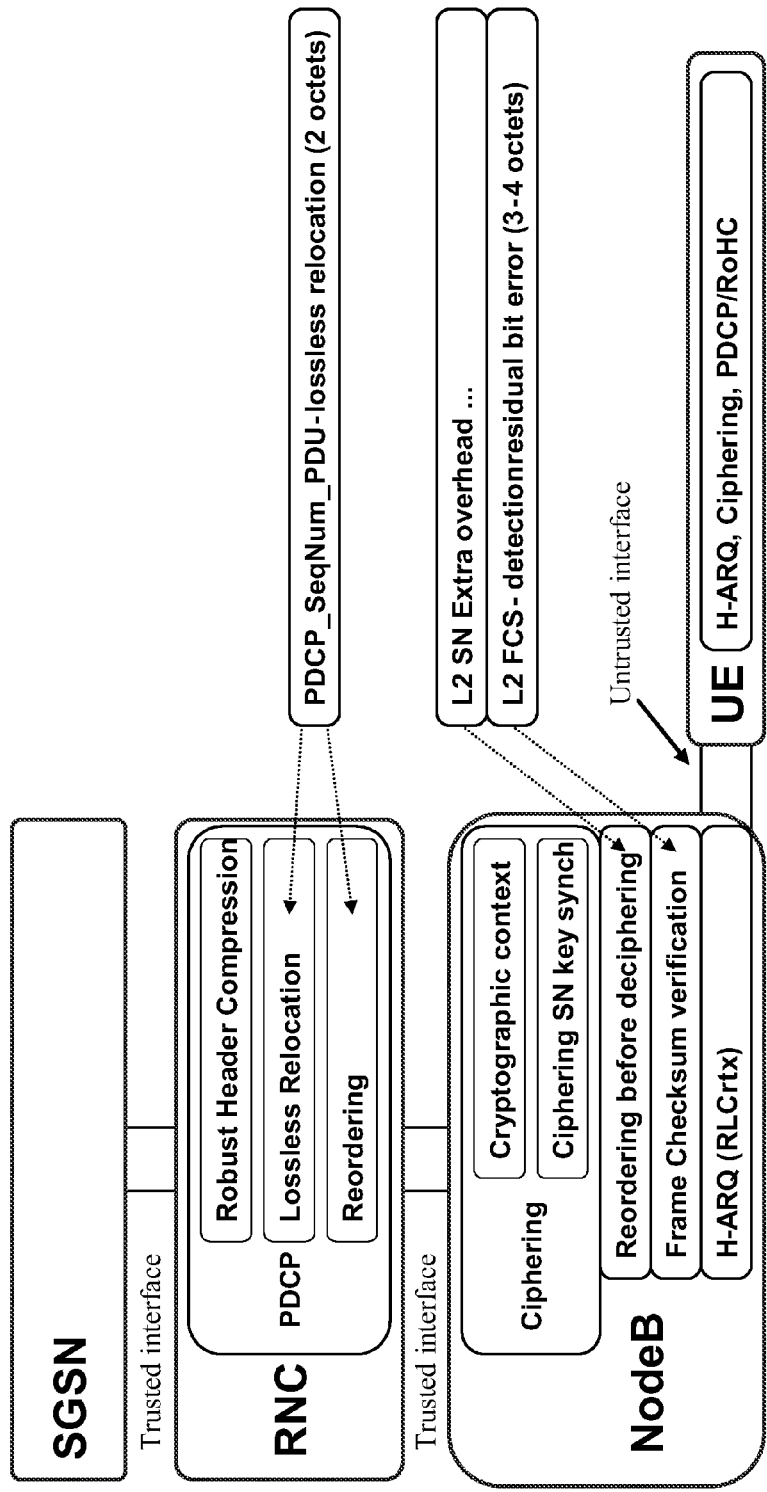
FIG. 4 is a diagrammatic view of an example traditional radio access network (RAN) architecture, here exemplified using the UTRAN architecture, and showing layering overhead.
Figure 5:
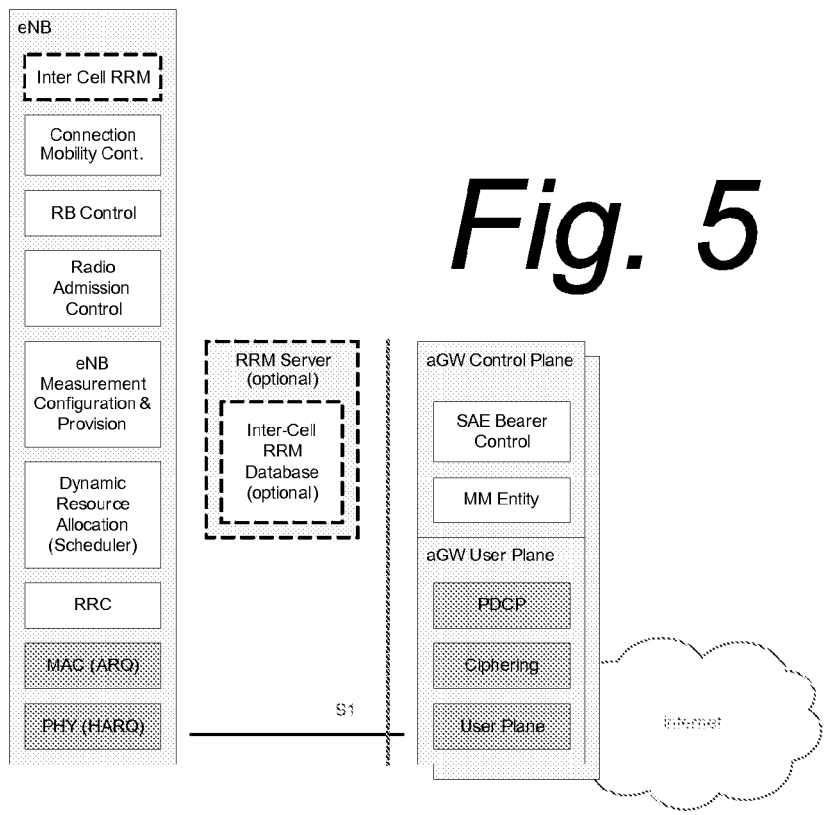
FIG. 5 is a diagrammatic view illustrating functional separation of architecture for System Architecture Evolution/ Long Term Evolution (SAE/LTE).
Figure 6:
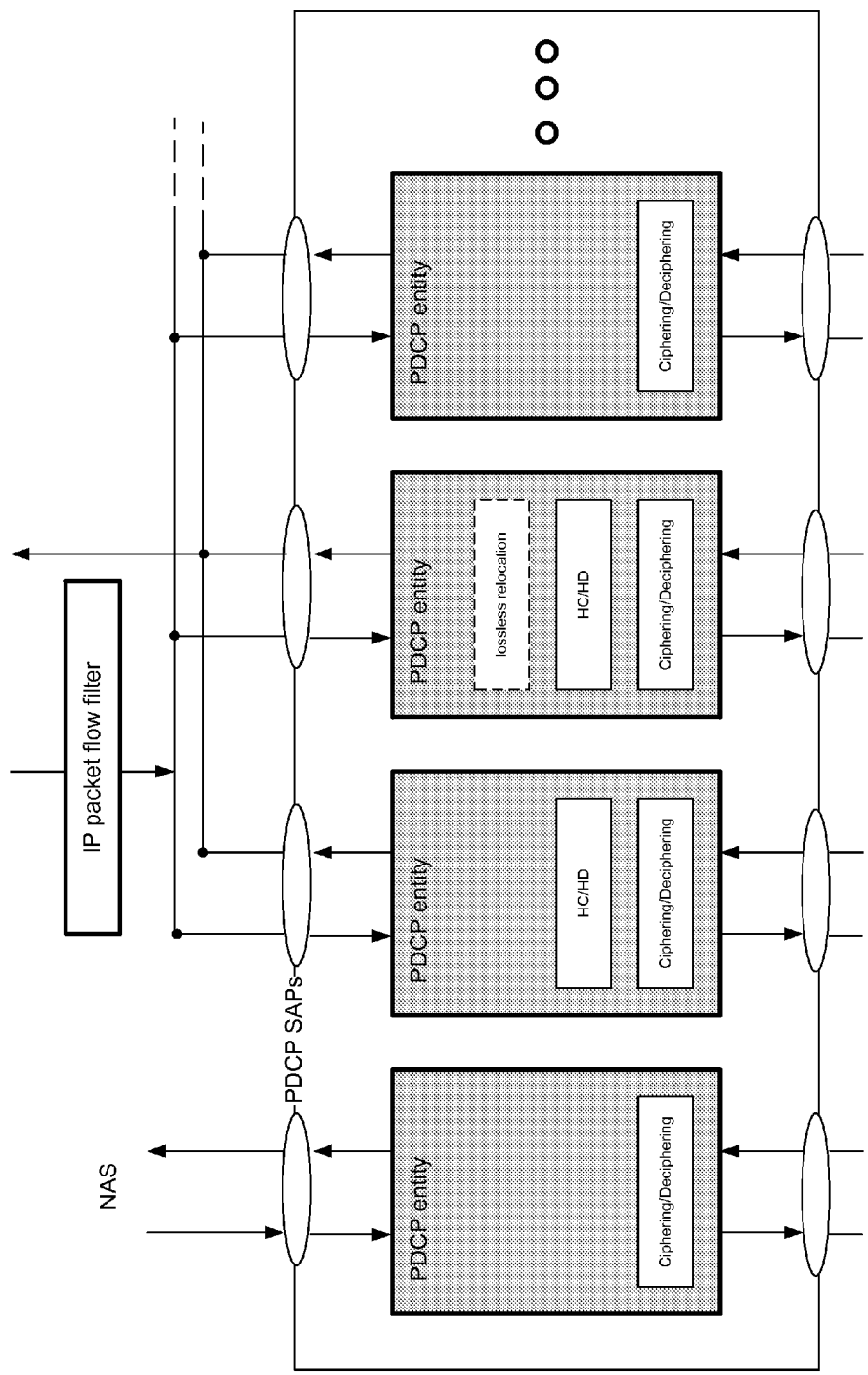
FIG. 6 is a diagrammatic view illustrating an example third party proposal with respect to PDCP functions and SAE/LTE architecture.
Figure 7:
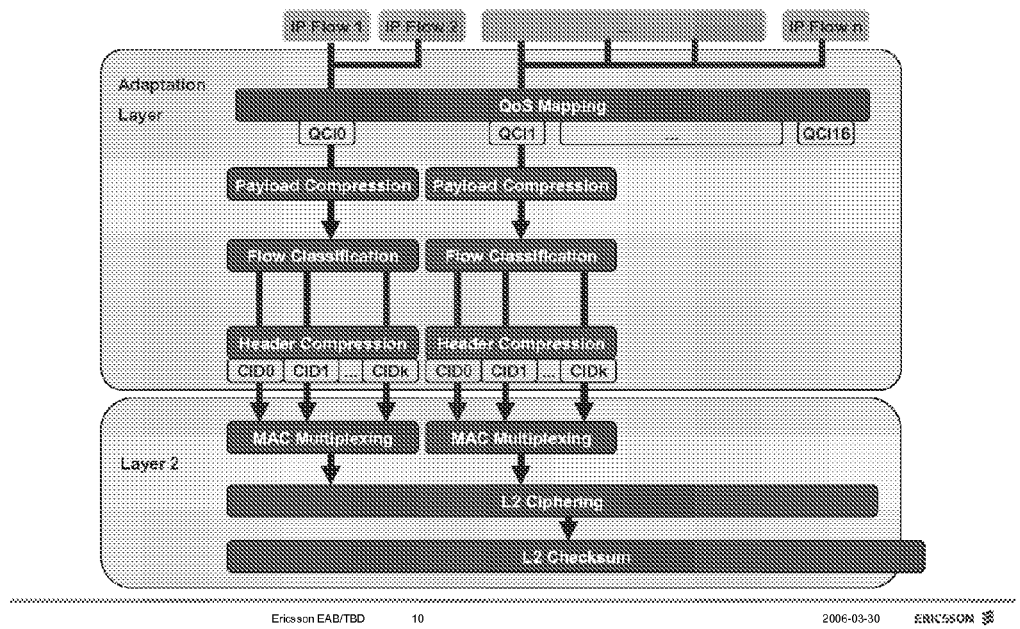
FIG. 7 is a diagrammatic view illustrating a layering approach with checksums, ciphering, and compression.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

1.0: Transaction(S) Shared by Plural Functions

FIG. 9A shows two nodes 20, 22 of a telecommunications network which communicate over an interface represented by dot-dashed line 24. In the particular situation shown in FIG. 9A, node 20 is a sending node and node 22 is a receiving node. This designation of sending node and receiving node is applied with reference to an illustrated direction of packet flow wherein packets obtained from packet source 26 are applied to sending node 20. The packets applied to sending node 20 are processed by sending node 20, and then are sent over interface 24 to receiving node 22. It will be appreciated that a stream of packets may also travel in a reverse direction from receiving node 22 to sending node 20, but for the purpose of describing the salient aspects of the present technology, consideration of a unidirectional stream from sending node 20 to receiving node 22 suffices.

A node 20 comprises a first function 30 configured to perform a first operation on a first portion of a packet handled by the node 20 and a second function 32 configured to perform a second operation on a second portion of the packet. The first function 30 and the second function 32 may be within the same model layer, and may be considered respectively to be different functional layers of a same model layer. For example, first function 30 can be considered to be a first functional layer within a particular model layer and second function 32 can be considered to be a second functional layer within the particular model layer. As used herein, any "layer" which is not a model layer is understood to be a functional layer.

While belonging to different functional layers (possibly within the same model layer), first function 30 and second function 32 are configured to employ a shared transaction and/or shared service 34 for operating on the packet. By virtue of the shared transaction and/or shared service 34, after performance of the first operation and the second operation, the packet that traverses interface 24 has less overhead attributable to the first function and the second function than if the shared transaction and/or shared service 34 had not been employed in performance of the first operation and the second operation.

FIG. 9A further shows that receiving node 22 comprises comparable functions, or perhaps more accurately inverses of selected functions of sending node 20. For example, receiving node 22 comprises second function inverse 40 and first function inverse 42. In addition, to correlative fashion to the shared transaction and/or shared service 34 of sending node 20, receiving node 22 has a shared transaction and/or shared service 44, which can be an inverse-type transaction of the shared transaction and/or shared service 34 employed at sending node 20.

The shared transaction and/or shared service 34 is illustrated generically in non-limiting manner in FIG. 9A. Specific, representative, non-limiting examples of the shared transaction and/or shared service are hereinafter described with respect to various example aspects of share transaction technology. No one example shared transaction and/or shared service is to be taken as exclusive or limiting, and the several examples provided are not exhaustive but are detailed only to provide an understanding of a broader scope of how functions can be combined or merged, at least partially, by techniques such as a shared transaction, for example. As used herein, the term "shared transaction" is understood to encompass both or either of a shared transaction and/or a shared service.

It should further be appreciated that nodes such as sending node 20 and receiving node 22 described herein typically have numerous functions beyond those specifically described herein, and that such nodes are not limited to the two functions illustrated as included therein or, in fact, to any particular number or nature of functions. For example, in one non-limiting example implementation, sending node 20 can be an access gateway (aGW) or an evolved NodeB (eNB) of a System Architecture Evolution/Long Term Evolution (SAE/LTE) telecommunications network, and as such can include, among others, the example functions shown in FIG. 8. In an SAE/LTE implementation, interface 24 can represent one or more (collective) interfaces, such as the S1 interface and the Uu (air) interface.

Figure 10:
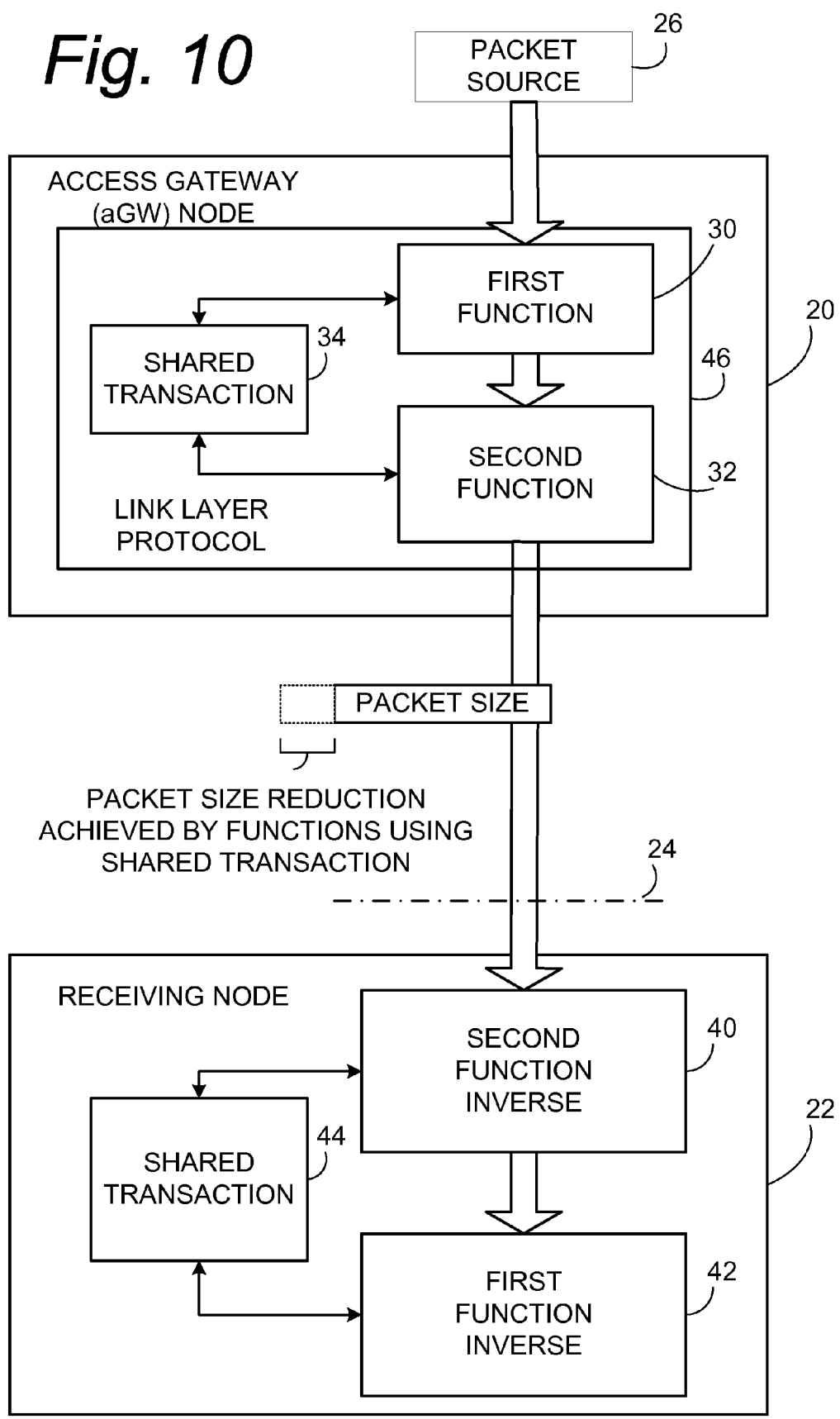
FIG. 10 is a diagrammatic view of a telecommunications network wherein a link layer protocol is provided and configured to perform a first function, a second function, and a shared transaction.

Further, in an example implementation illustrated in FIG. 10, a link layer protocol 46 is provided and is configured to perform the first function 30, the second function 32, and the shared transaction 34. In other implementations, these functions need not all be performed or hosted by the link layer protocol.

Figure 9B:
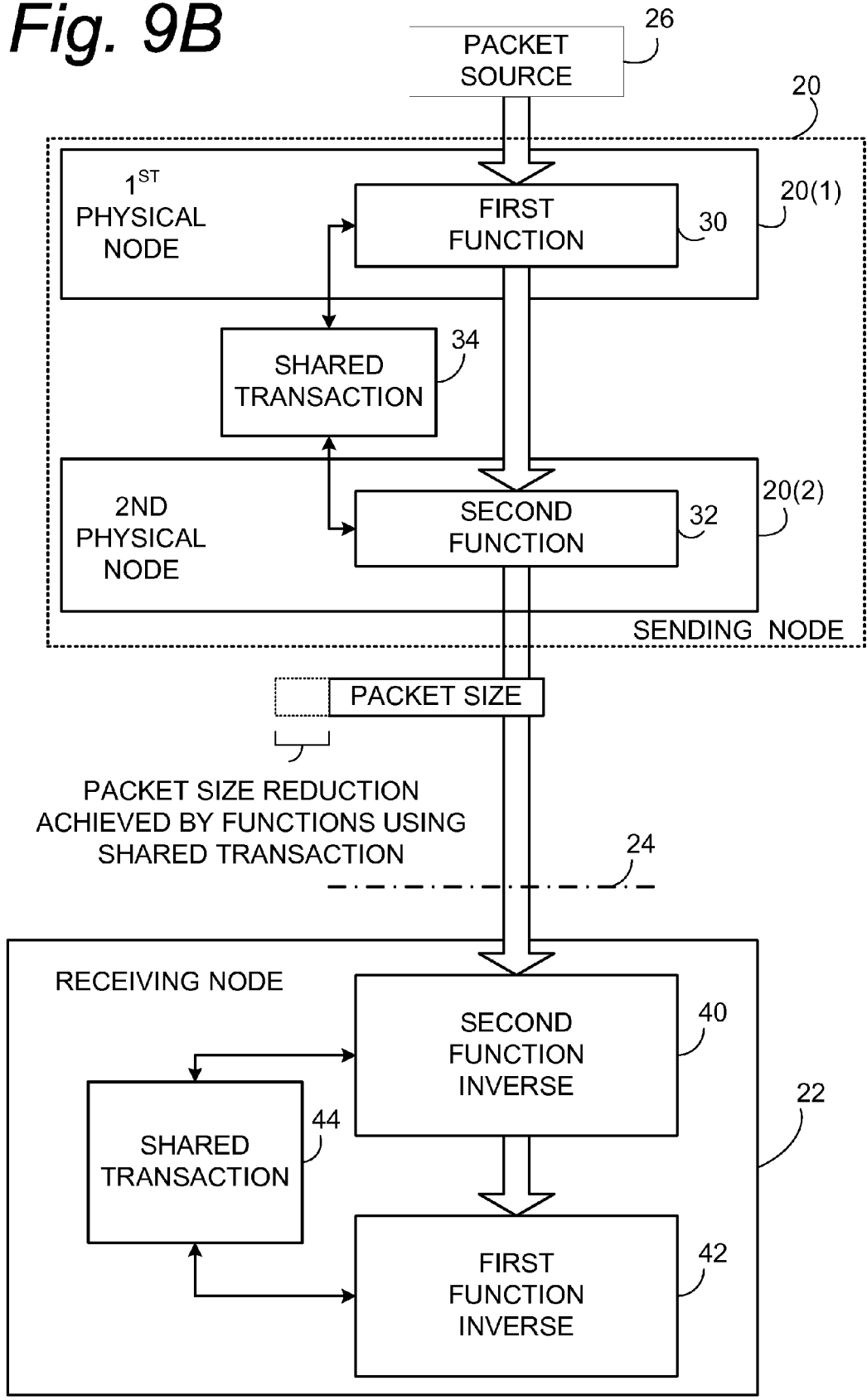
FIG. 9B is a diagrammatic view of a telecommunications network wherein in a first function and a second function of a same model layer but distributed to plural nodes comprising a single sending node employ a generic shared transaction and/or shared service for reduction of packet overhead.

For sake of simplicity, FIG. 9A and FIG. 10 illustrate sending node 20 which comprises first function 30 and second function 32 as being a single node. However, as used herein, the term "node", and particularly the sending node, encompasses plural nodes having functions which participate in the shared transaction technology. In other words, the sending node in which the shared transaction technology is employed need not be a single node, but instead can comprise plural nodes over which the multiple functions (e.g., first function 30 and second function 32) may be distributed. For example, FIG. 9B shows sending node 20 as comprising two physically distinct nodes 20(1) and 20(2). The first physical node 20(1) comprises first function 30, while the second physical node 20(1) comprises second function 32. The first function 30 and the second function 32 may or may not belong to the same model layer protocol 46B (e.g., the link layer), and are subject to or involved in the shared transaction 34B. The shared transaction 34B may be executed or provided by either first function 30 or second function 32, or a combination of functions. Thus, FIG. 9B illustrates the shared transaction technology as being applicable to different functional layers (e.g., different functions such as function 30 and function 32), even though the functions (e.g., functional layers) may exist or be performed at different physical nodes. Although this distribution of the shared transaction technology over plural physical nodes is only illustrated in FIG. 9B, such distribution applies to all embodiments and modes described herein.

In the generic FIG. 9A embodiment, the FIG. 9B embodiment, the FIG. 10 embodiment, and all subsequent embodiments, the first function 30, the second function 32, and shared transaction 34 can be performed by a controller or processor of sending node 20, given the broad description and understanding of the words "processor" and "controller" as hereinbefore provided.

Figure 11:
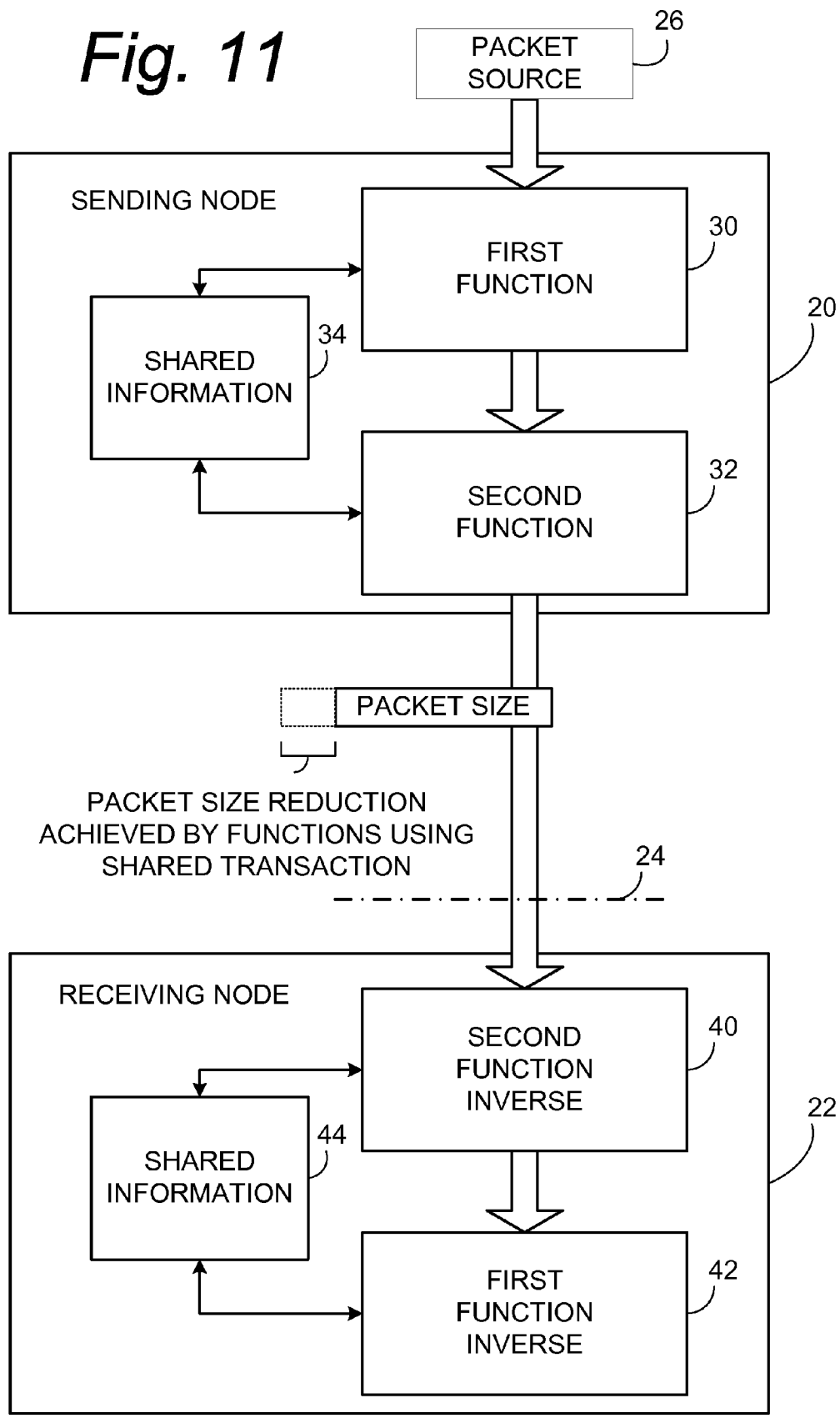
FIG. 11 is a diagrammatic view of a telecommunications network wherein a shared transaction and/or shared service comprises shared information employed by plural functions of a node.

In one aspect of the technology illustrated in FIG. 11, the shared transaction comprises shared information employed the first function and the second function. A non-limiting example of the shared information is common sequencing information described further below and particularly (for example) with reference to section 4.0 hereof.

Basically, one single field containing sequencing information is carried on the behalf of a plurality of these processes, independently of what combination of processes is active. The layer that supports ciphering and/or header compression and/or payload compression and/or signalling compression is used to carry sequencing information. This sequencing information may be common to multiple functional layers (e.g. header compression and ciphering, or another combination) when more than one is active, and is may be generated by either one of the active processes/algorithms (or by a multiplicity thereof if multiple operations are implemented or activated in conjunction). This sequencing information may also arise from a layer protocol under the header compression process and/or the ciphering process and/or the payload compression process and/or the signalling compression process. Alternatively, the sequencing information may arise from another layer above the link layer, such as from the application layer (e.g., from a protocol such as Real Time Protocol (RTP) which is in the application layer).

Figure 12:
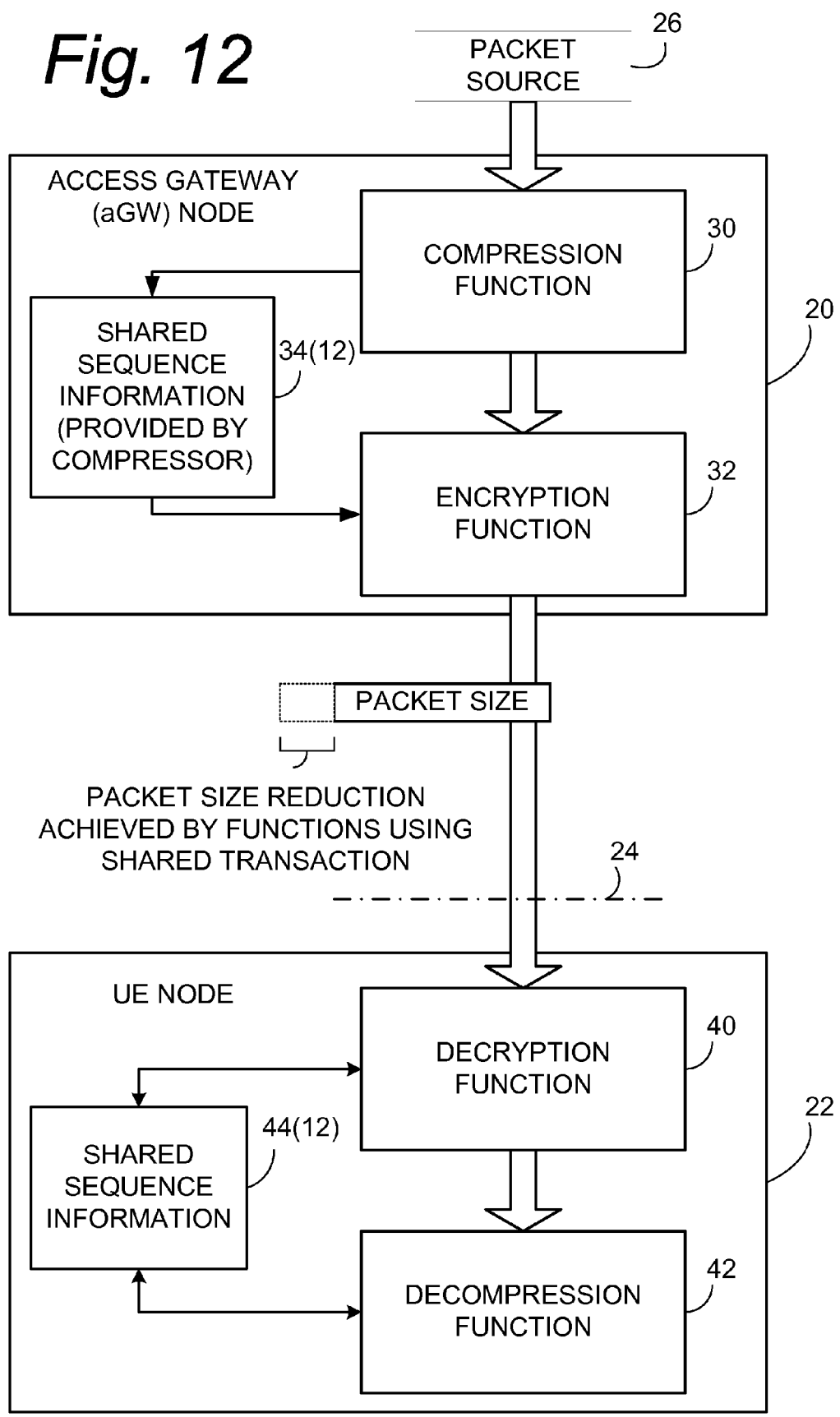
FIG. 12 is a diagrammatic view of a telecommunications network wherein a shared transaction and/or shared service comprises a sequence number originated by a compression function.

For example, in one example implementation illustrated in FIG. 12, the first function 30 is a data compression function and the second function 32 is an encryption function, and the shared information 34(12) is a sequence number originated by the compression function 30 as a sequence number MSN for the compression function 30. The same sequence number is also used by the encryption function 32 to derive a session key for the encryption operation. In the receiving node 22 of FIG. 12 the shared transaction and/or shared service is shared sequence information 44(12).

Figure 13:
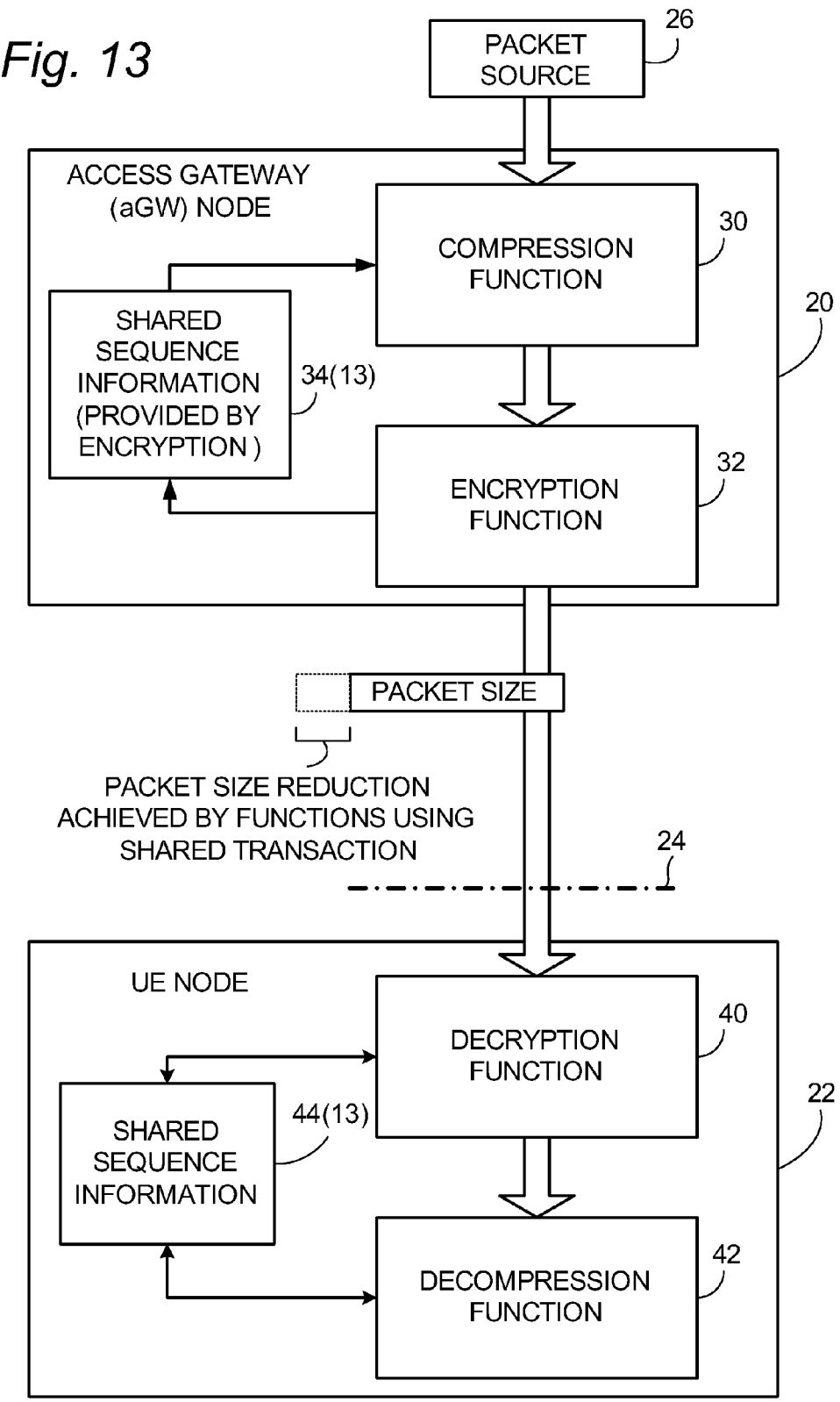
FIG. 13 is a diagrammatic view of a telecommunications network wherein a shared transaction and/or shared service comprises a sequence number originated by an encryption function.

In another example implementation illustrated in FIG. 13, in which the first function 30 is again data compression function and the second function 32 is an encryption function, the shared information 34(13) is a sequence number originated by the encryption function 32 from which a session key is derived and is also used by the compression function 30 as a sequence number MSN. In the receiving node 22 of FIG. 13 the shared transaction and/or shared service is shared sequence information 44(13).

A sequence number can be derived as an offset to the shared sequence number for the compression algorithm. Basically, compression algorithms that transmit sequence number information encode this sequence number as an offset from the sequence numbering that is shared between a plurality of function layers.

The ciphering layer normally performs over a connection, processing all SDUs independently of what IP flow they belong to. This may be the same for compression algorithms and protocols, but often these instead operate on a finer granularity level and process packets per flow to obtain increased compression efficiency. In such case, a sequence number that is shared with another layer that operates on a "connection" will change value per SDU, and not per packet of a flow—unless the connection exactly maps to one and only one packet flow.

The change pattern as seen by a "per-flow" compression algorithm will depend on the rate of each flow over the connection (which may be varying) as well as on the number of different flows. However, the change pattern of the jump in sequence number will likely be bounded to a limited value, and compression algorithms may send compress bits (LSB or W-LSB) based on the shared sequence number, either based on its absolute value or based on an offset. See also offset encoding in Carsten Bormann, et al. *RObust Header Compression (ROHC). Framework and four profiles: RTP, UDP, ESP and uncompressed.* IETF RFC 3095, April 2001.

Examples of a compression algorithm that can operate "per-flow" includes header compression and/or payload compression and/or signalling compression and/or header removal.

Figure 14:
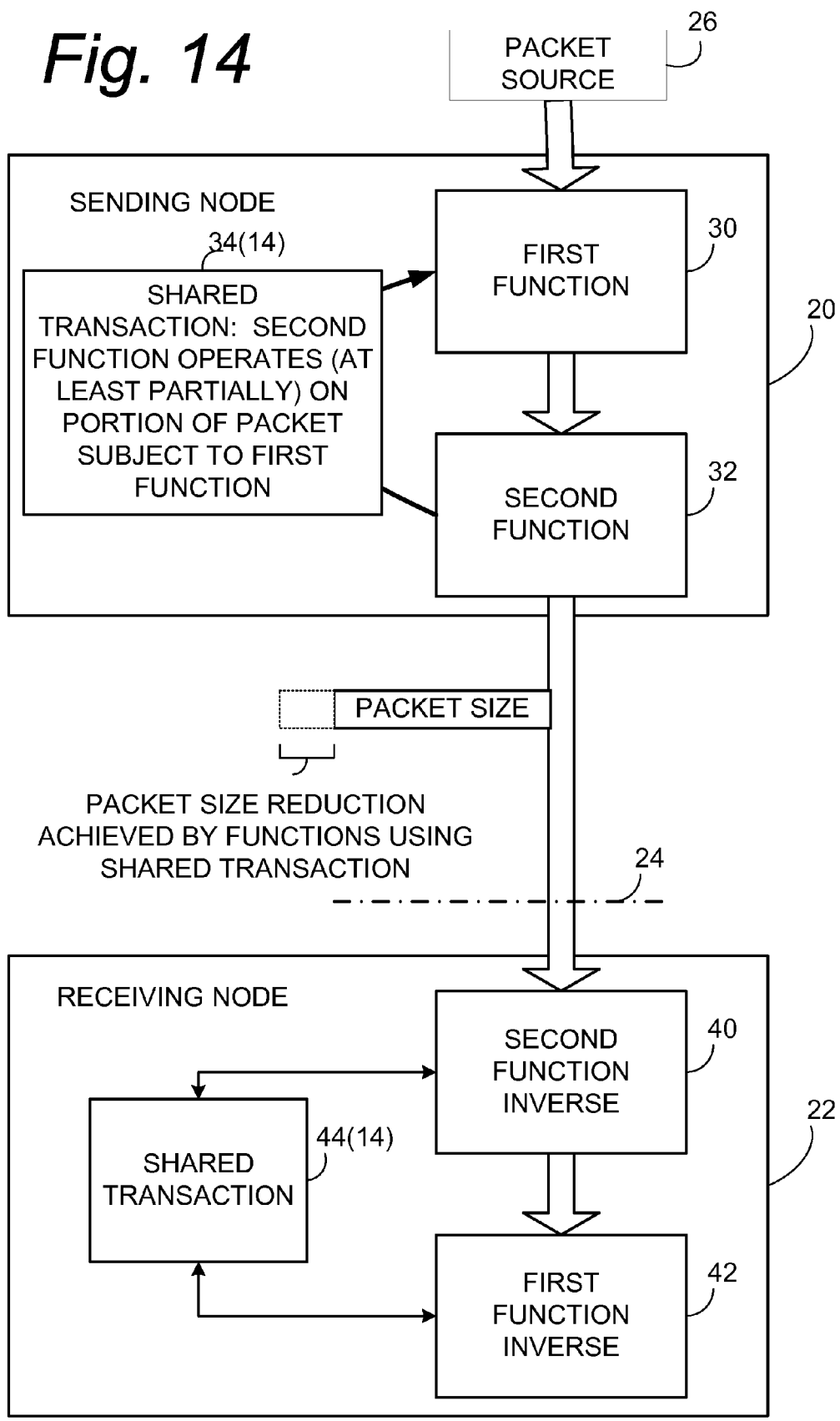
FIG. 14 is a diagrammatic view of a telecommunications network wherein a shared transaction and/or shared service comprises a second function operating not only on a second part of the packet, but also operating on a first portion of the packet which is subject, at least in part, to operation by a first function.
Figure 15:
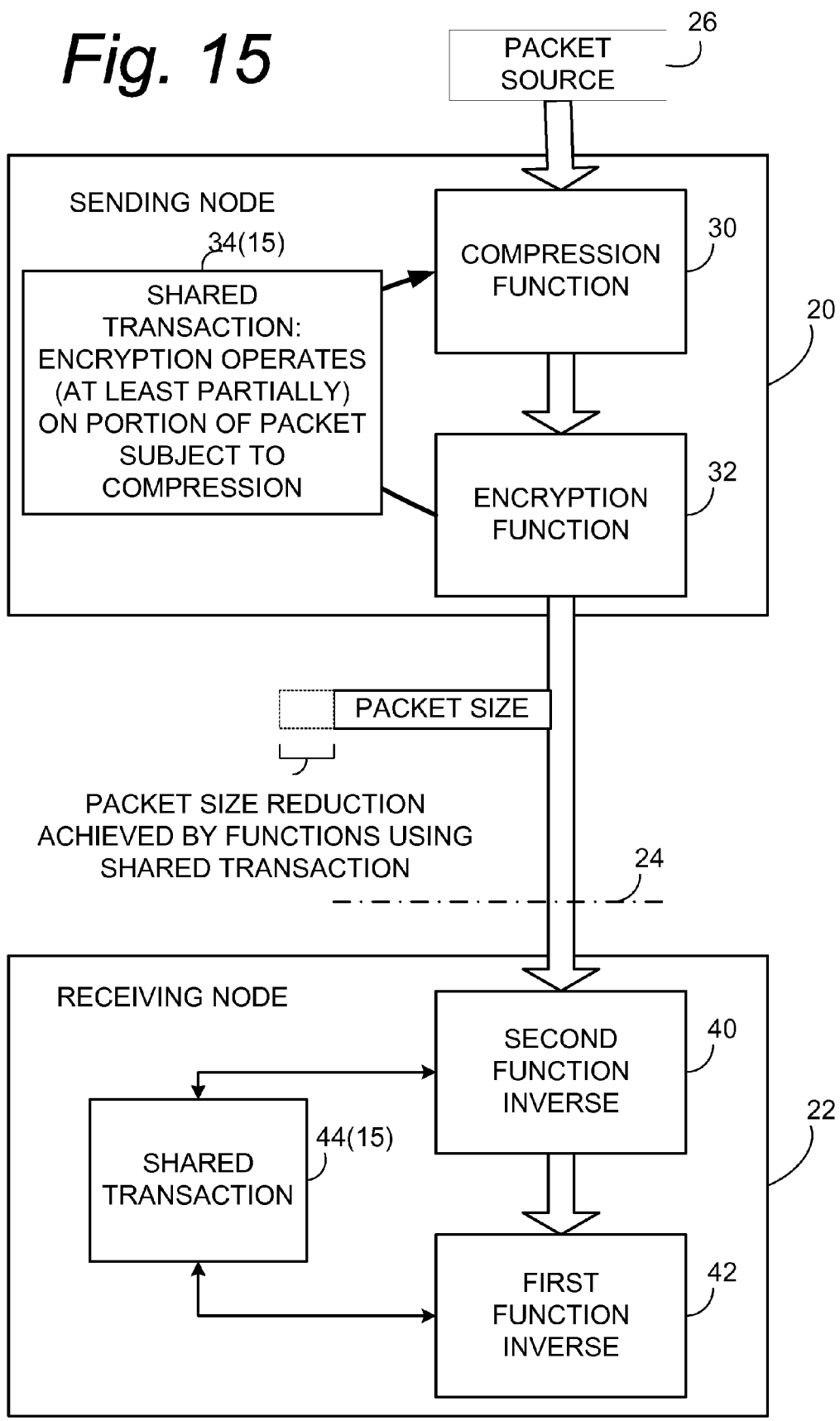
FIG. 15 is a diagrammatic view of a telecommunications network wherein a shared transaction and/or shared service comprises an encryption function operating on a portion of the packet which is subject, at least in part, to compression.

In another aspect of the technology generically illustrated in FIG. 14, the shared transaction 34(14) comprises the second function 32 operating not only on the second part of the packet, but also operating on the first portion of the packet which is subject, at least in part, to operation by the first function 30. The receiving node 22 of FIG. 14 comprises shared transaction 44(14). For example, in one example implementation shown in FIG. 15, the first function 30 is a data compression function and the second function 32 is an encryption function, and the encryption function 32 encrypts at least a portion of a header of the packet (but, as explained hereinafter, does not encrypt compression channel identifiers or sequencing of the header). FIG. 15 further shows shared transaction 34(15) at sending node 20 (the shared transaction 34(15) being encryption which operates (at least partially) on a portion of the packet subject to compression) and the shared transaction 44(15) at receiving node 22. This example implementation is described further below, particularly (for example) with reference to section 3.0 hereof.

Figure 16:
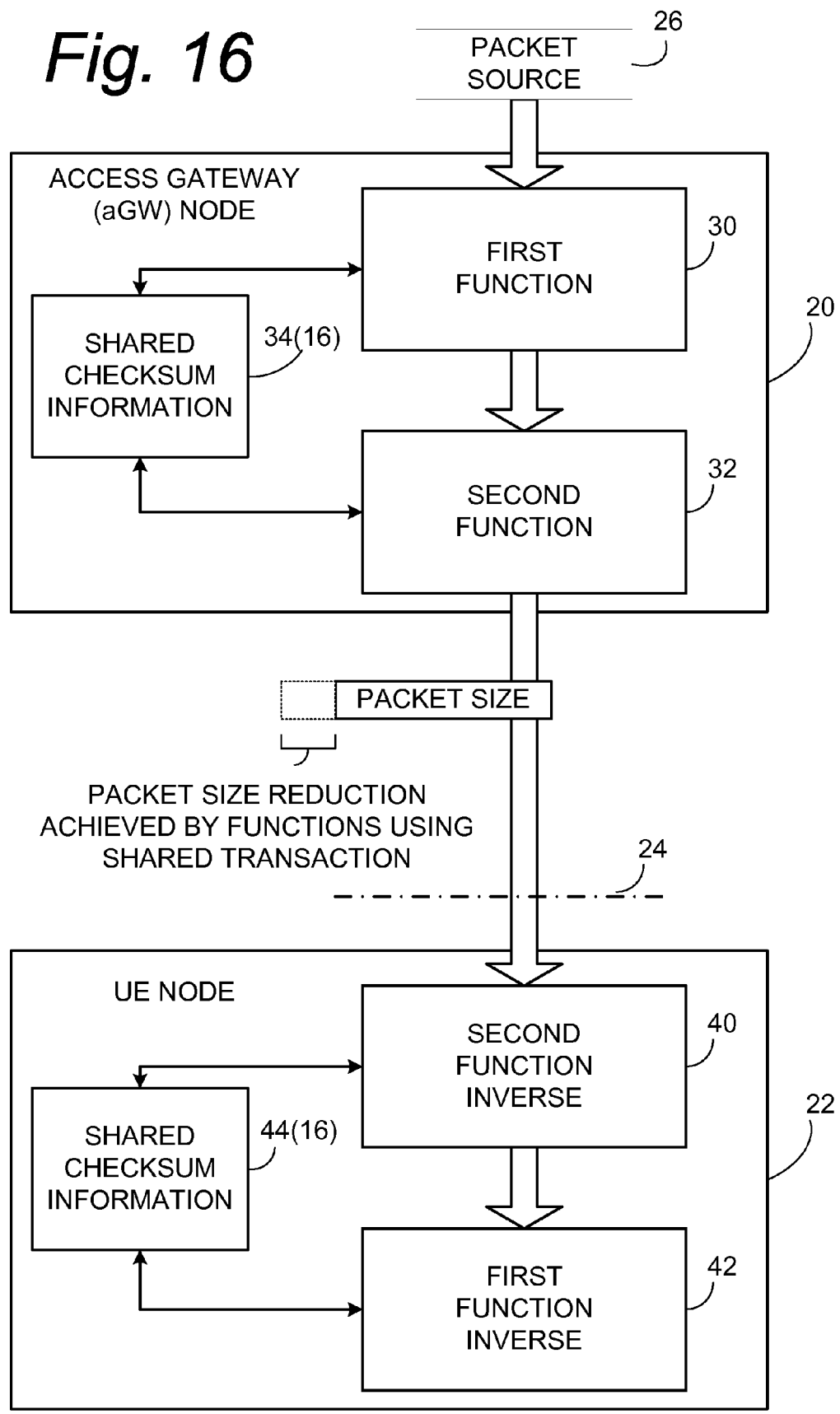
FIG. 16 is a diagrammatic view of a telecommunications network wherein a shared transaction and/or shared service comprises determination of a shared checksum.

In one aspect of the technology generically illustrated in FIG. 16, the shared transaction comprises determination of a checksum over at least a part of the first portion of the packet and over at least a part of the second portion of the packet, e.g., determination of a "shared checksum". FIG. 16 further shows shared transaction 34(16) at sending node 20 (the shared transaction 34(16) being shared checksum information) and the shared transaction 44(16) at receiving node 22. The underlying layer carries the common checksum information, e.g., the layer supporting ciphering and/or header compression and/or signalling compression and/or payload compression carries the checksum information. This information may be common to multiple functional layers (e.g. header compression and ciphering, or another combination) when more than one is active, and is thus generated by either one of the active processes/algorithms (or by a multiplicity thereof if multiple operations are implemented or activated in conjunction).

Figure 17:
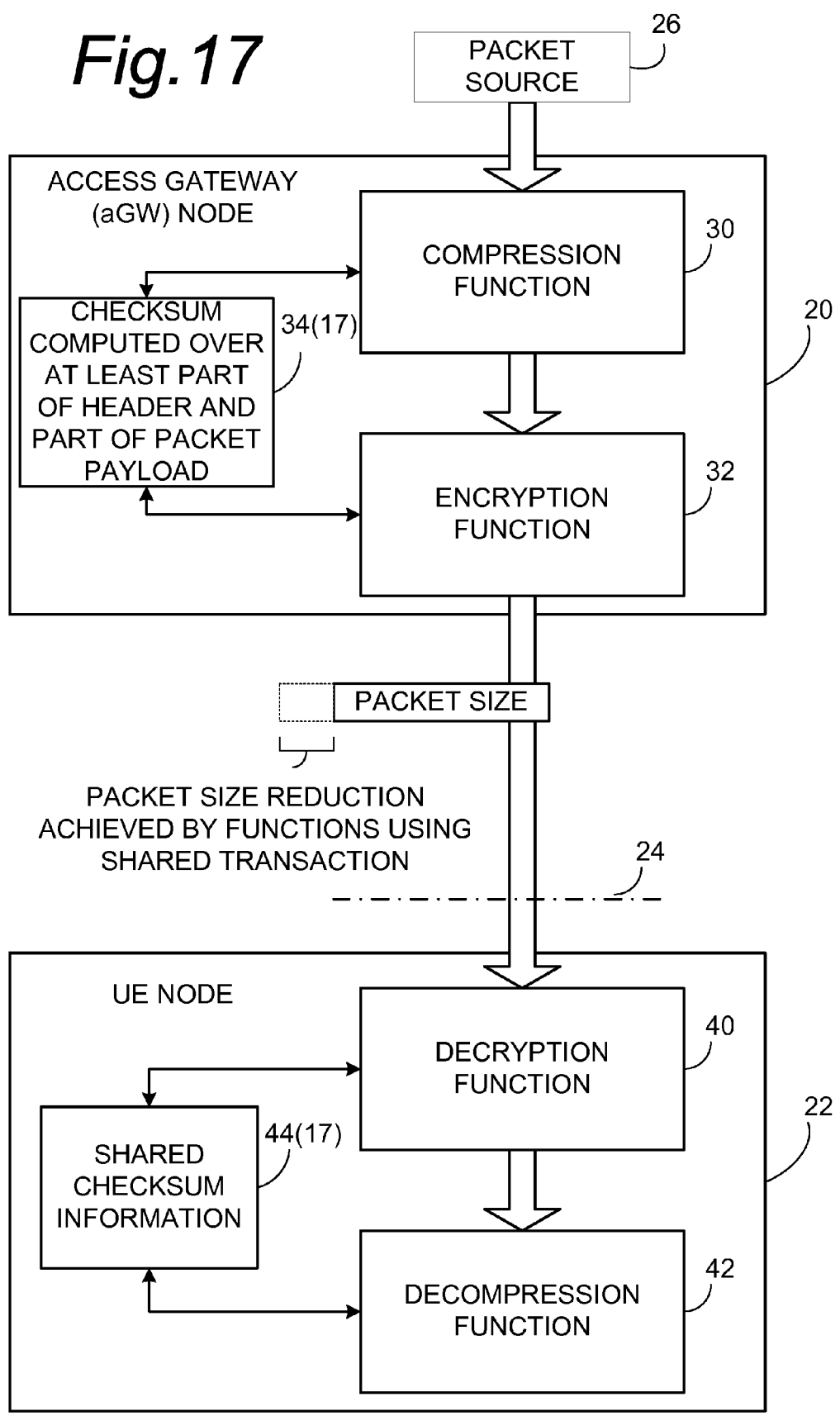
FIG. 17 is a diagrammatic view of a telecommunications network wherein a shared transaction and/or shared service comprises determination of a checksum over at least part of the header of the packet and over at least a part of the payload of the packet.

In an example implementation shown in FIG. 17, the first function 30 is a data compression function, the first portion of the packet is a packet header, the second function 32 is an encryption function, and the second portion of the packet is a packet payload. FIG. 17 further shows shared transaction 34(17) at sending node 20 (the shared transaction 34(17) being computation of a checksum over at least part of the header and part of the packet payload) and the shared checksum information transaction 44(17) at receiving node 22. The checksum is determined over at least part of the header of the packet and over at least a part of the payload of the packet. This example implementation is described further below, particularly (for example) with reference to section 2.1 hereof.

Figure 18:
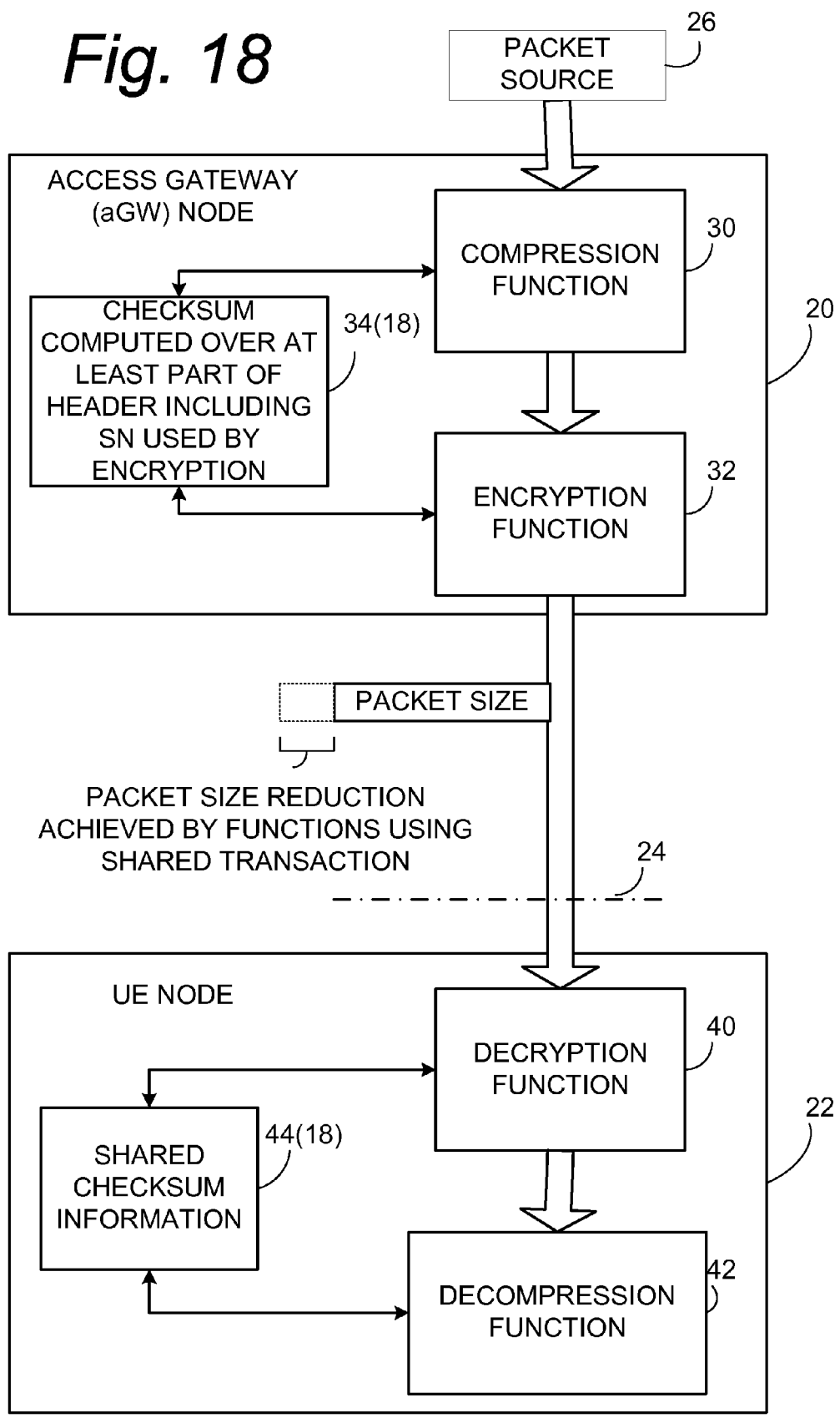
FIG. 18 is a diagrammatic view of a telecommunications network wherein a shared transaction and/or shared service comprises determination of a checksum over at least a part of the first portion of the packet (e.g., the packet header) which includes a parameter utilized by the second function in operating on the second portion of the packet.

In another example implementation shown in FIG. 18, the shared transaction 34(18) comprises determination of a checksum over at least a part of the first portion of the packet (e.g., the packet header), and the part of the first portion of the packet over which the checksum is determined comprises a parameter utilized by the second function in operating on the second portion of the packet. FIG. 18 also shows the shared checksum information 44(18) of receiving node 22. For example, in an implementation wherein the second portion of the packet is a packet payload, the checksum is determined over at least part of the header of the packet, and the parameter utilized by the second function in operating on the second portion of the packet is a sequence number to derive a session key for its cryptographic context. This example implementation is described further below, particular (for example) with reference to section 2.2 hereof.

Thus, in view of the shared transaction and essentially combined or merged functionalities, method and apparatus are provided for sharing such transactions/information as sequencing information and checksum information between multiple functions operating in the same endpoints, e.g., multiple functional layers operating within the same model layer. The shared transaction technology is applicable to any two sending and receiving suitable nodes, whether adjacent or not, and is particularly but not necessarily exclusively suitable to situations or architectures wherein the link layer maintains and transports sequencing and/or checksum information on the behalf of a plurality of functions/processes which shares the same information. Moreover, as explained previously with reference to FIG. 10B, the sending node in which the shared transaction technology is employed need not be a single node, but instead can comprise plural sending nodes over which the multiple functions may be distributed. Functions (e.g., functional layers) included or targeted by the technology can be (for example) any of header compression, header removal and regeneration, payload compression, signaling compression, encryption and reordering functions and any combination thereof.

As summarized above and further explained below, header compression and ciphering (and possibly other functions) can share the sequencing information and checksum, reducing overhead of having separate sequencing and checksums. The SAE/LTE architecture provides a candidate system for this idea to be applied within the Access Gateway (aGW) and the User Equipment (UE).

A layer such as the link layer carries sequencing information and checksum(s) on the behalf of multiple functional layers (e.g. such as ciphering, and/or payload compression and/or header compression) operating within the same endpoints and that shares this same information. As another aspect, ciphering and header compression are handled together, at least in part, while providing robustness to reordering and packet losses between compression/encryption endpoints to the session key derivation algorithm of the ciphering process. Moreover, cryptographic context management is handled in cooperation with context management for header compression, for the purpose of making the selection of the cryptographic key derivation more robust.

Using the shared transaction technology, shared of transactions between functions, such as sharing of sequencing and checksums between functions that can be made to use the same information and that operate within the same endpoints (such as any of robust header compression, header removal, payload compression, signaling compression and/or ciphering in any combination), results in overhead reduction. For example, using the shared transaction technology, in some embodiments and/or implementation overhead can be reduced in the manner of Table 2.

TABLE 2

| | |
|---|---|
| common checksum (e.g. CRC16): | 2+ octets (bit errors, decompression, verification) |
| common Sequence Number: | 1 octet (reordering + ciphering key) |
| Total: | 3+ octets |

As indicated above, a shared transaction such as shared sequencing and checksums are introduced between functions that can be made to use the same information and that operate within the same endpoints (such as any of robust header compression, header removal, payload compression, signaling compression and/or ciphering in any combination) to remove some overhead. The following describes potential example embodiments, based on, but not limited to, the compressor and decompressor sequencing requirements and behavior of RFC 3095, Carsten Bormann, et al. *RObust Header Compression (ROHC). Framework and four profiles. RTP, UDP, ESP and uncompressed*. IETF RFC 3095, April 2001, and general properties of ciphering algorithms.

2.0: Combined Management of Compression Contexts and Cryptographic Contexts: Overview In one of its aspects, the technology concerns combined management of compression contexts and cryptographic contexts using a combined or shared transaction. Context management rules of the compression algorithm are applied to the management of the cryptographic context, when ciphering is performed using sequencing and checksums (i.e. decompression validation) derived from the compression protocol. The combined context management features a sending node and a receiving node, with the sending node performing, e.g., compression on at least a portion of a header portion of a packet and encryption on at least a portion of the packet in a manner whereby the compression and the encryption are bound to an extent that, at the receiving node, verification of decompression and decryption of the packet are interdependent.

In a first example mode of this aspect, the shared transaction or combined suboperation includes determining a composite checksum over at least a portion of a packet to be compressed and a portion of the packet to be encrypted. In the first mode, as computed, e.g., in a sending node, the checksum may cover the (original unencrypted) portion of the part of the packet that will be encrypted, as well as the (original uncompressed) portion that will be compressed. At the receiving side, the ciphering layer performs decryption of the encrypted portion of the packet and the decompressor decompresses the compressed portion (if there is no overlap, either processing may come first). In the first mode, the checksum is then used to verify the outcome both the decompression and the decryption process and when successful, this results in the update of the respective compression and cryptographic contexts. In other words, if decompression is verified, then decryption succeeded as well and is thus implicitly verified.

In a second example mode of the aspect of combined management of compression contexts and cryptographic contexts, the combined suboperation includes the compression function and the encryption function using a sequence number as shared information, the sequence number being used by the encryption function for a session key derivation. In the second mode, only the (original uncompressed) portion that will be compressed need be covered by the checksum, inclusive of sequence number information, for the case where the ciphering function uses the compression Master Sequence Number to derive session keys from its cryptographic context. Thus, in the second example mode, a checksum is computed over at least a portion of a packet to be compressed and (optionally) over a portion of the packet to be encrypted. In the second mode, the checksum is used to validate the outcome of the decompression process only, and when successful this results in the update of the respective compression and cryptographic contexts. The sequence number MSN is thus verified, and this is the only sensitive information for the cryptographic context.

In either mode, the transport layer (e.g., UDP, TCP) checksum may be used to provide further confirmation of the outcome of the process. The context updating rules also follows the context updating logic of the compression in the second mode.

Ciphering is performed together with header compression in the same node, reducing overhead for sequencing and reordering function. Combining ciphering and header compression features into one single protocol could be the practical outcome of this technology. The protocol may also include support for payload compression and the same type of rules could be applied to this as well.

Context management herein applies for the case where the entire compressed packet is encrypted or only a subset thereof (e.g. only the payload is ciphered). In both modes, the checksum facilitates verification of the compression operation and the encryption operation.

Figure 19:
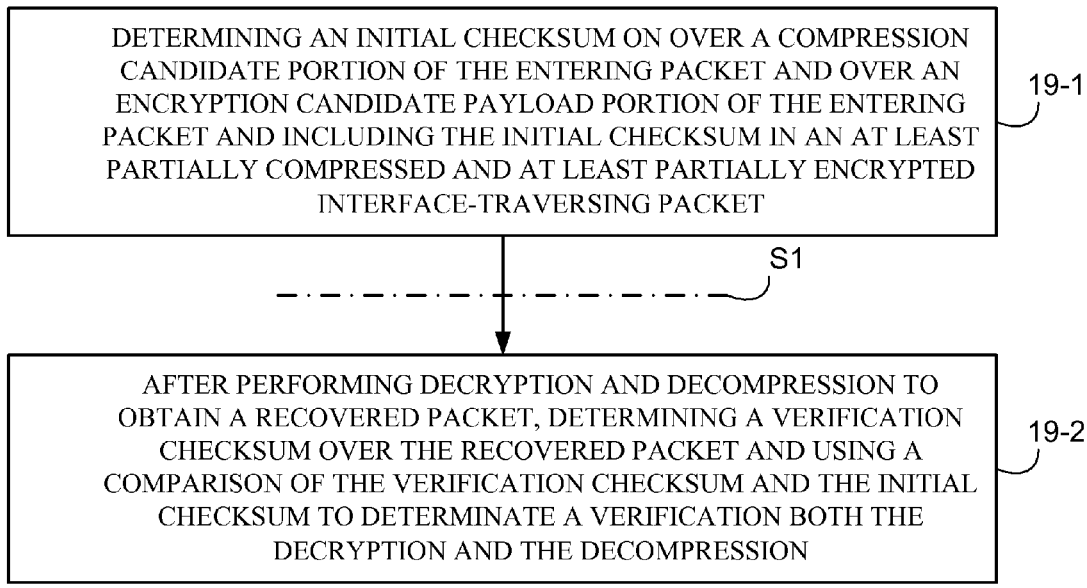
FIG. 19 is a flowchart showing example basic, representative acts or events involved in a first example mode of combined management of compression contexts and cryptographic contexts.

2.1: Combined Management of Compression Contexts and Cryptographic Contexts: First Mode: Overview FIG. 19 shows example basic, representative acts or events involved in the first example mode. Act 19-1 shows example actions performed at a sending node. In particular, for an entering packet at the sending node, an initial checksum is determined over a compression candidate portion of the entering packet and over an encryption candidate payload portion of the entering packet. The initial checksum is included in an at least partially compressed and at least partially encrypted interface-traversing packet. The interface-traversing packet is subsequently transmitted over an interface, depicted by way of example as interface 24 in FIG. 9A. As indicated previously, interface 24 can be a single interface (e.g., the S1 interface or the Uu interface in the case of an enhanced nodeB), or can collectively represent several interfaces such as both the S1 interface and the Uu interface. Act 19-2 shows example actions performed upon reception of the interface-traversing packet at the receiving node after decryption and decompression are performed to obtain a recovered packet. The actions of act 19-2 include determining a verification checksum over the recovered packet. Further, a comparison of the verification checksum and the initial checksum is used to determinate a verification both the decryption and the decompression.

2.1.1: Combined Management of Compression Contexts and Cryptographic Contexts: First Mode: Implementation: Sending Node An example detailed implementation of the first mode of FIG. 19 at the sending node is illustrated by the actions of flowchart of FIG. 20 in conjunction with the correspondingly arranged packet depictions of FIG. 21. A corresponding detailed implementation of the first mode of FIG. 19 at the receiving node is illustrated by the actions of flowchart of FIG. 22 in conjunction with the correspondingly arranged packet depictions of FIG. 23.

At the sending node for the example implementation of the first mode, act 19-1-*a* involves determining the initial checksum ICKSM over the compression candidate portion of the entering packet and over the encryption candidate payload portion of the entering packet. In the example implementation, FIG. 21 shows the initial checksum ICKSUM being computed or determined over the entire compression candidate portion CCP and the entire encryption candidate payload portion ECPR of the entering packet. It will be appreciated that the checksum ICKSUM of act 19-1-*a* can be computed over less than the entire entering packet, e.g., computed over less than the entire compression candidate portion CCP and/ or over less than the entire encryption candidate payload portion ECPR, so long as the checksum computation logic understands or is preconfigured consistently in both the sending node and the receiving node.

Act 19-1-*b* comprises performing compression on the compression candidate portion CCP of the entering packet to provide a compression string CS. The compression of act 19-1-*b* can be any suitable compression technique, including but not limited to those described or mentioned herein.

Act 19-1-*c* comprises encrypting at least the encryption candidate payload portion ECPR of the entering packet to provide an encryption string ES. In the example implementation shown in FIG. 21, the encryption covers not only the encryption candidate payload portion ECPR, but also the compression candidate portion CCP. It should be understood that, in a variation implementation, the encryption can also cover the initial checksum ICKSUM. Alternatively, in another variation, the encryption can cover only the encryption candidate payload portion ECPR (not the compression candidate portion CCP or the initial checksum ICKSUM). By whatever implementation or variation, the encryption of act 19-1-*b* can be any suitable encryption technique, including but not limited to those described or mentioned herein.

Act 19-1-*d* comprises forming an interface-traversing packet corresponding to the entering packet. The packet formation of act 19-1-*d* involves, including in the interface-traversing packet, at least the compression string CS, the encryption string ES, and the initial checksum. When the encryption covers only the encryption candidate payload portion ECPR, these three components are separately assembled into the interface-traversing packet. However, in case the encryption covers more than the encryption candidate payload portion ECPR, all or a portion of one or more of the other components of the interface-traversing packet may be subsumed by the encryption string ES. That is, if the encryption covers the compression candidate portion CCP, then including the encryption string ES in the interface-traversing packet encompasses including all or a portion of the compression candidate portion CCP in the interface-traversing packet. Similarly, if the encryption covers the initial checksum ICKSM, then including the encryption string ES in the interface-traversing packet encompasses including the initial checksum ICKSM in the interface-traversing packet.

2.1.2: Combined Management of Compression Contexts and Cryptographic Contexts: First Mode: Implementation: Receiving Node The corresponding detailed implementation of the first mode of FIG. 19 at the receiving node is illustrated by the actions of flowchart of FIG. 22 in conjunction with the correspondingly arranged packet depictions of FIG. 23. Act 19-2-*a* of FIG. 22 comprises decrypting the encryption string ES of the interface-traversing packet to provide a decryption string. The decryption of act 19-2-*a* is performed by the inverse of the corresponding encryption technique utilized at act 19-1-*c*.

In view of the particular implementation shown in FIG. 21, since the encryption string ES was prepared to include the compression string CS, FIG. 22 shows the decryption as unpacking the encryption string ES to provide the compression string CS and a payload portion which corresponds (assuming the encryption and decryption were successful) to encryption candidate payload portion ECPR. If, in another variation, the compression string CS had not been subject to encryption, the compression string CS would not now be subject to the decryption of act 19-2-*a*. Further, if in still another variation, the initial checksum ICKSM had also been subject to encryption (as represented by broken lines in FIG. 22), the initial checksum ICKSM would also be decryption as part of act 19-2-*a*.

Act 19-2-*b* comprises decompressing the compression string CS of the interface-traversing packet to provide a decompression string DS. The decompression of act 19-2-*b* is performed by the inverse of the compression technique which was used for the compression operation of act 19-1-*b*.

Act 19-2-*c* comprises determining the verification checksum VCKSUM over the decompression string DS and the decryption string in a manner to corresponding to the determining of the initial checksum in act 19-1-*a*).

Act 19-2-*d* comprises using the comparison of the verification checksum and the initial checksum as performed at act 19-2-*c* to determinate the verification both the decrypting of act 19-2-*a* and the decompression of act 19-2-*b*.

Act 19-2-*e* comprises updating a compression context in accordance with the verification of act 19-2-*d*. Act 19-2-*f* comprises updating a cryptographic context in accordance with the verification of act (2-*d*).

Combined Management of Compression Contexts and Cryptographic Contexts: First Mode: Epilogue Thus, in the first mode of combined management of compression contexts and cryptographic contexts, ciphering and compression use or share the same checksum, with the checksum coverage including (at least part of) the payload.

Basically, the checksum used for verifying the outcome of the decompression process also validates the success of the session key determination (e.g., of the deciphering process). As shown broadly in FIG. 19 and in more specific example implementation in FIG. 20 and FIG. 21, the checksum covers the (original unencrypted) portion of the part of the packet that will be encrypted, as well as the (original uncompressed) portion that will be compressed.

At the sending side (see, e.g., FIG. 20, act 19-1-*a*), the checksum is calculated so that it covers the (original unencrypted) portion of the part of the packet that will be encrypted, as well as the (original uncompressed) portion that will be compressed.

At the receiving side (see, e.g., FIG. 20), the packet is first deciphered (see, e.g., act 19-2-*a*). Note that the sequencing is independent of compression. The result of the deciphering process may then be passed to the decompressor without verifying the outcome of the deciphering process. Decompression is then performed (act 19-2-*b*).

The checksum received (initial checksum ICKSM) together with the compressed packet is then used to verify the outcome of both the decompression and the decryption processes. If successful, the respective compression and cryptographic contexts are updated (act 19-2-*e* and act 19-2-*f*). The compression context is updated based on the context updating properties of the compressed format as well as based on the operating mode, when applicable. Provided that the checksum covered at least all the information that was ciphered, if the decompression is successful then the deciphering operation can be assumed successful as well, and relevant state can be updated for processing the next packet.

2.2: Combined Management of Compression Contexts And Cryptographic Contexts: Second Mode: Overview In the second example mode of the aspect of combined management of compression contexts and cryptographic contexts, the combined suboperation includes the compression function and the encryption function using a sequence number as shared information, the sequence number being used by the encryption function for or to derive a session key derivation. In addition, in the second example mode of this aspect, a checksum is computed over at least a portion of a packet to be compressed and (optionally) over a portion of the packet to be encrypted. In both modes, the checksum facilitates verification of the compression operation and the encryption operation.

Figure 24:
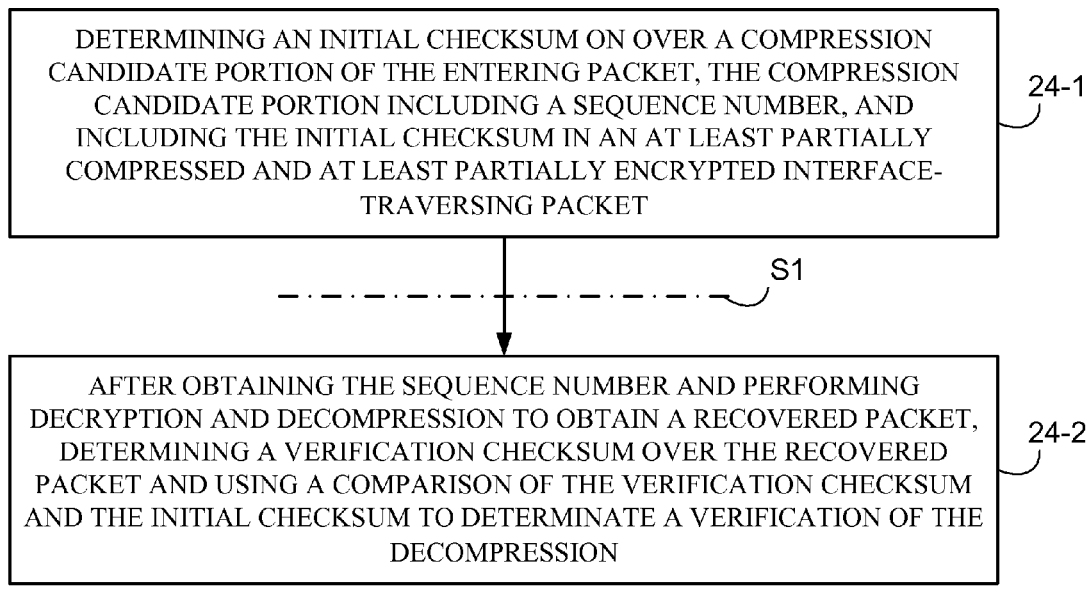
FIG. 24 is a flowchart showing example basic, representative acts or events involved in a second example mode of combined management of compression contexts and cryptographic contexts.

2.2.1: Combined Management of Compression Contexts and Cryptographic Contexts: Second Mode: Implementation: Sending Node Acts FIG. 24 shows example basic, representative acts or events involved in the second example mode. Act 24-1 shows example actions performed at a sending node. In particular, for an entering packet at the sending node, an initial checksum is determined over a compression candidate portion of the entering packet. In this second mode, the compression candidate portion includes a sequence number which is used for the compression operation. Moreover, in the second mode the same sequence number is used as shared information for deriving a session key for use in the encryption of the encryption candidate payload portion of the entering packet. The initial checksum is included in an at least partially compressed and at least partially encrypted interface-traversing packet. The interface-traversing packet is subsequently transmitted over an interface, depicted by way of example as interface 24 in FIG. 9A. As indicated previously, interface 24 can be a single interface (e.g., the S1 interface or the Uu interface in the case of an enhanced nodeB), or can collectively represent several interfaces such as both the S1 interface and the Uu interface. Act 24-2 shows example actions performed upon reception of the interface-traversing packet, including obtaining the sequence number. After decryption and decompression are performed to obtain a recovered packet, a verification checksum is determined over the recovered packet. A comparison of the verification checksum and the initial checksum is used to determinate a verification of the decompression.

An example detailed implementation of the second mode of FIG. 24 at the sending node is illustrated by the actions of flowchart of FIG. 25 in conjunction with the correspondingly arranged packet depictions of FIG. 26. A corresponding detailed implementation of the second mode of FIG. 24 at the receiving node is illustrated by the actions of flowchart of FIG. 27 in conjunction with the correspondingly arranged packet depictions of FIG. 28.

At the sending node for the example implementation of the second mode, act 24-1-a involves determining the initial checksum. In particular, the initial checksum being determined over the compression candidate portion CCP of the entering packet. If the sequence number MSN is a sequence number that is part of the original uncompressed IP header, then the sequence number MSN should be covered by the checksum in the manner shown by the corresponding illustration in FIG. 26. On the other hand, if the sequence number MSN is generated by the compression algorithm and does not occur in the original uncompressed IP header, then its only purpose is to decompress the header and therefore need not be part of the information that is verified after both processes of decompression and decryption (and thus need not be covered by the initial checksum.

As an option (and accordingly as shown by broken lines in the checksum formation of FIG. 26), in some variations the initial checksum is also determined over an encryption candidate payload portion ECPR of the entering packet, the encryption candidate payload portion of the entering packet using the sequence number for a session key derivation. It will be appreciated that the checksum ICKSUM of act 24-1-a can be computed over less than the entire entering packet, e.g., computed over less than the entire compression candidate portion CCP and/or over less than the entire encryption candidate payload portion ECPR, so long as computed over the sequence number MSN and so long as the checksum computation logic understands or is preconfigured consistently in both the sending node and the receiving node.

Act 24-1-b comprises performing compression on the compression candidate portion CCP of the entering packet to provide a compression string CS. The compression of act 24-1-b can be any suitable compression technique, including but not limited to those described or mentioned herein.

Act 24-1-c comprises encrypting at least the encryption candidate payload portion ECPR of the entering packet to provide an encryption string ES. In the example implementation shown in FIG. 26, the encryption covers not only the encryption candidate payload portion ECPR, but also substantially the entire compression candidate portion CCP, except the sequence number MSN. For this reason, sequence number MSN or a compressed version thereof, is separately illustrated in FIG. 26 alongside the encryption string ES. It should be understood that, in a variation implementation, the encryption can also cover the initial checksum ICKSUM. Alternatively, in another variation, the encryption can cover only the encryption candidate payload portion ECPR (not the compression candidate portion CCP or the initial checksum ICKSUM). By whatever implementation or variation, the encryption of act 24-1-b can be any suitable encryption technique, including but not limited to those described or mentioned herein.

Act 24-1-d comprises forming an interface-traversing packet corresponding to the entering packet. The packet formation of act 24-1-d involves, including in the interface-traversing packet, at least the compression string CS including the sequence number MSN, the encryption string ES, and the initial checksum. When the encryption covers only the encryption candidate payload portion ECPR, these three components are separately assembled into the interface-traversing packet. However, in case the encryption covers more than the encryption candidate payload portion ECPR, all or a portion of one or more of the other components of the interface-traversing packet may be subsumed by the encryption string ES. That is, if the encryption covers the compression candidate portion CCP excepting the sequence number MSN, then including the encryption string ES in the interface-traversing packet encompasses including a portion of the compression candidate portion CCP in the interface-traversing packet. Similarly, if the encryption covers the initial checksum ICKSM, then including the encryption string ES in the interface-traversing packet encompasses including the initial checksum ICKSM in the interface-traversing packet.

2.2.2: Combined Management of Compression Contexts and Cryptographic Contexts: Second Mode: Implementation: Receiving Node The corresponding detailed implementation of the second mode of FIG. 24 at the receiving node is illustrated by the actions of flowchart of FIG. 27 in conjunction with the correspondingly arranged packet depictions of FIG. 28. Act 24-2-a of FIG. 27 comprises obtaining the sequence number MSN from the interface-traversing packet. For example, the sequence number MSN can be decompressed as a part of the compression string CS that was not encrypted. The sequence number MSN could not have been encrypted if it is to used for decryption, but it can have been compressed.

Figures 27, 28:
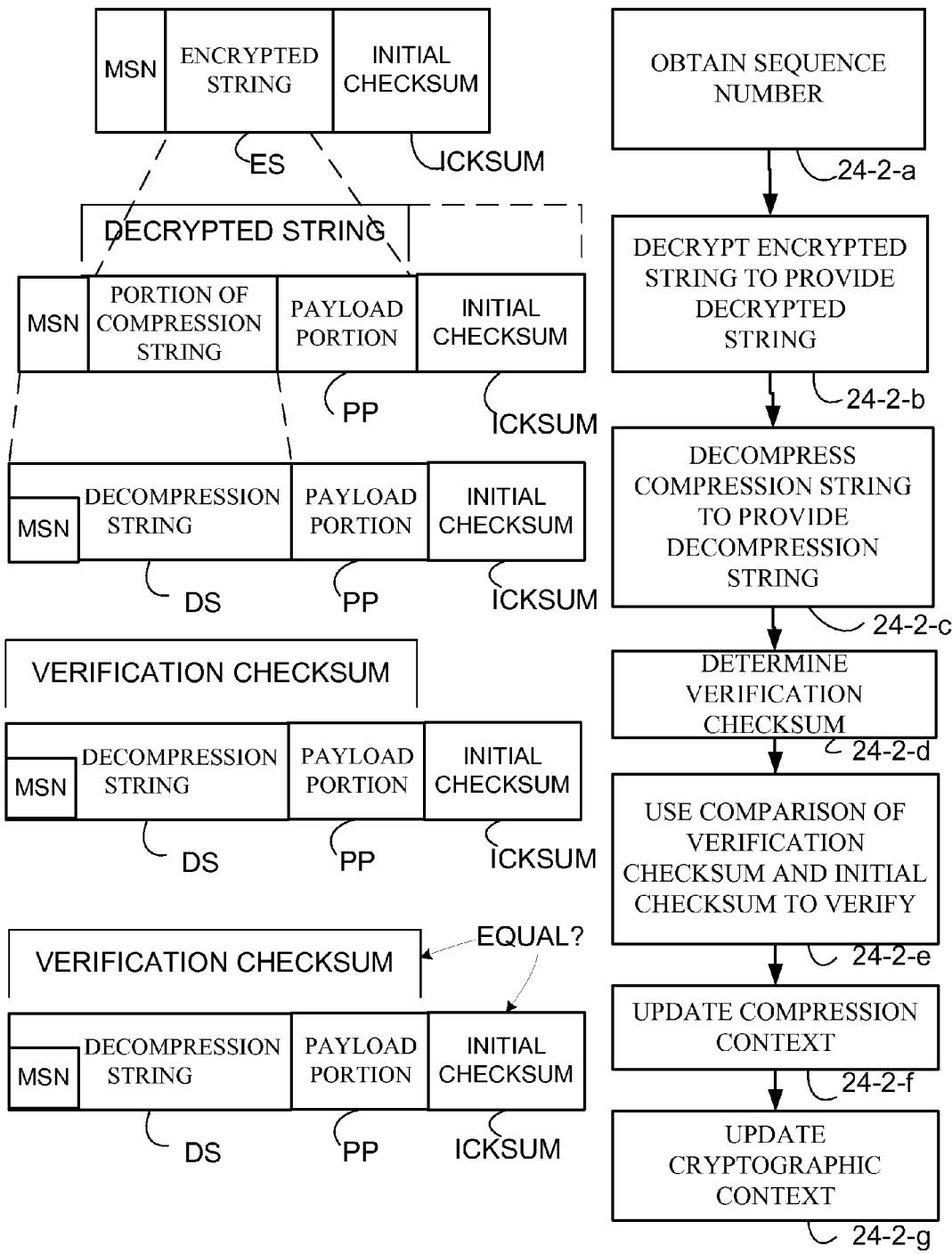
FIG. 27 is a flowchart showing example actions performed at a receiving node in an example implementation of the second mode of FIG. 24.
FIG. 28 is a diagrammatic view showing packet depictions corresponding to the actions of FIG. 27.

Act **24-2-*b* comprises decrypting the encryption string ES of the interface-traversing packet to provide a decryption string. In correspondence with act 24-2-*b*, FIG. 28 shows the decryption string as including a portion of the compression string CS (e.g., the portion of compression string CS which was encrypted at act 24-1-*c* and the packet payload. The decryption of act 24-2-*b* is performed by the inverse of the corresponding encryption technique utilized at act 24-1-*c***.

Act **24-2-*c* comprises decompressing the portion of the compression string of the interface-traversing packet to provide a decompression string. In correspondence with act 24-2-*c*, FIG. 911-10 shows the decompression string as including the sequence number MSN. The decompression of act 24-2-*c* is performed by the inverse of the compression technique which was used for the compression operation of act 24-1-*b***.

Act **24-2-*d* comprises determining the verification checksum VCKSUM over at least the decompression string and optionally over the decryption string in a manner to corresponding to the determining of the initial checksum ICKSM in act 24-1-*a***.

Act **24-2-*e* comprises using a comparison of the verification checksum and the initial checksum to determinate a verification of the decompression of act 24-2-*c***.

Act **24-2-*f* comprises updating a compression context in accordance with the verification of act (2-*f*). Act 24-2-*g* comprises updating a cryptographic context in accordance with the verification of act 24-2-*e***.

2.3: Combined Management of Compression Contexts And Cryptographic Contexts: Second Mode: Epilogue Thus, in the first mode of combined management of compression contexts and cryptographic contexts, the checksum used for verifying the outcome of the decompression process validates the success of the session key determination (deciphering process). The checksum minimally covers the (original uncompressed) portion that will be compressed including the Master Sequence Number (MSN), but it may exclude the (original unencrypted) portion of the part of the packet that will be encrypted if the deciphering process uses the same MSN for session key derivation.

At the sending side, e.g., the sending node, the checksum ICKSUM is calculated so that it minimally covers the (original uncompressed) portion that will be compressed—including the MSN, but it may exclude the (original unencrypted) portion of the part of the packet that will be encrypted if the deciphering process uses the same MSN for session key derivation.

At the receiving side, e.g., the receiving node, at least the MSN is first decompressed, or recovered (act **24-2-*a***). Then deciphering and decompression are performed (decryption must come before decompression of fields other than the MSN if at least some part of the compressed portion is encrypted). The checksum is then used to validate the outcome of the decompression process only. If successful, the respective compression and cryptographic contexts are updated based on the context updating properties of the compressed packet format as well as based on the operating mode, if applicable and as defined by the compression algorithm. The sequence number MSN is thus verified, and this is the only sensitive information for the cryptographic context.

2.4: Combined Management of Compression Contexts and Cryptographic Contexts: Some Advantages The combined management of compression contexts and cryoptographic contexts as described above or otherwise encompassed hereby has numerous advantages, a few of which are listed below. A first example advantage is overhead minimization: This technology expands the context management functionality of cryptographic algorithms to include robustness characteristics of header compression context updating, when common checksum is used. This also can save some overhead.

A second example advantage is impact on existing standards and architectures: This technology does not preclude lower layers to have own functionality for error detection. Used in combination as proposed, it may allow lower layers to turn off some of their error detection mechanisms, which is normally required with an independent encryption layer. This may reduce the total overhead. In other words, this is not a layer violation or cross-layer integration.

A third example advantage is mutual benefits and improved robustness for the cryptographic context: The ciphering function benefits from the robustness characteristics of the header compression algorithm with respect to sequencing information, and thus lowers the probabilities that the cryptographic context loses synchronization with respect to sequencing. Would this happen, resynchronization will occur from within the recovery mechanisms of the header compression algorithm.

A fourth example advantage is applicability to header compression in general: This is particularly applicable to most ROHC profiles, including—but not limited to—the ROHC RTP (0x0001), UDP (0x0002), IP (0x0004), ESP (0x0003), TCP (0x0006), UDP-Lite (0x0008), RTP/UDP-Lite (0x0007) header compression profiles. It is also especially relevant, but not limited to, ciphering and encryption algorithms such as stream ciphers that allows e.g., using a bit mask, that only special bits are unencrypted/encrypted. Examples of such stream ciphers include A5, GEA, UEA and AES. Other ciphering and encryption algorithms of relevance are those that make use of sequencing information to derive parameters necessary to (de)ciphering.

Other non-limiting and example features and advantages of this technology further include the following:

The checksum used for verifying the outcome of the decompression process validates the success of the session key determination (deciphering process). When successful, the cryptographic context is updated.

Robust cryptographic context management may be achieved using a checksum that covers the (original unencrypted) portion of the part of the packet that will be encrypted, as well as the (original uncompressed) portion that will be compressed. The checksum is made available to the decompression process, and the outcome is made available to the ciphering algorithm.

Robust cryptographic context management may be achieved using a checksum that minimally covers the (original uncompressed) portion that will be compressed—including the MSN, but it may exclude the (original unencrypted) portion of the part of the packet that will be encrypted if the deciphering process uses the same Master Sequence Number (MSN) for session key derivation. The checksum is made available to the decompression process, and the outcome is made available to the ciphering algorithm. When successful, the cryptographic context is updated based on the context-updating and operational mode of the compression algorithm, if applicable.

The transport layer (e.g., UDP, TCP) checksum may be used to provide further confirmation of the outcome of the process.

The checksum uses the same coverage as the UDP-Lite checksum, when UDP-Lite is used.

The checksum replaces the transport layer checksum, provided that it covers at least the information that the transport layer is protection. The transport layer checksum is first verified.

The foregoing is applicable, e.g., to the specific case where the compression algorithm is implemented according to a Robust Header Compression (ROHC) profile, including—but not limited to—the ROHC RTP (0x0001), UDP (0x0002), IP (0x0004), ESP (0x0003), TCP (0x0006), UDP-Lite (0x0008), RTP/UDP-Lite (0x0007) header compression profiles.

The foregoing is applicable, e.g., to the specific cases when the header compressor and/or decompressor are/is implemented according to any other header compression schemes in general.

The foregoing is applicable, e.g., to the specific case where the ciphering and encryption algorithms are stream ciphers, including but not limited to A5, GEA, UEA and AES. Other ciphering and encryption algorithms that make use of sequencing information to derive parameters necessary to (de)ciphering are also within scope.

The foregoing is applicable, e.g., to other compression algorithms, such as signalling compression such as SigComp, Payload Compression algorithms (such as those defined in Pereira, R., *IP Payload Compression Using DEFLATE*, IETF RFC 2394, December 1998; and Friend, R. et R. Monsour, *IPPayload Compression Using LZS*, IETF RFC 2395, December 1998) or any other operations that require sequencing and checksums, for which this information can be shared with other algorithms and which originates and terminates in the same nodes.

The foregoing is applicable, e.g., to aGW currently being defined in 3GPP RAN 2 standardization working group as part of the SAE/LTE work.

3.0: Secure Header Compression: Overview

In accordance with another and separate aspect of the technology, employable (for example) in conjunction with other aspects herein described, encryption or ciphering functions are performed on parts of the header compression protocol. That is, techniques describe herein permit encryption of some or the entire payload of the packet and the compressed header format as well (except for the header fields having functions related to the header compressed channel).

A header compression algorithm (such as a Robust Header Compression profile compatible with the existing RoHC framework) is created to efficiently combine ciphering with header compression to create an encrypted header-compressed flow. Ciphering is performed on the entire header-compressed packet including the payload using the uncompressed representation of the (otherwise possibly compressed) header compression Master Sequence Number (MSN) as well as on as much as possible of the compressed header itself. Fields that cannot be encrypted are the fields necessary to support:

| | |
|---|---|
| multiplexing of flows | (e.g. RoHC CIDs), |
| packet type identification | (e.g. RoHC packet type), |
| the (possibly compressed) MSN and | |
| the identifier for the compression algorithm when applicable e.g. for initial packets | (e.g. RoHC profile octet) – (e.g. RoHC IR packets). |

An example, non-limiting embodiment comprises two corresponding nodes (adjacent or not) where both header compression and ciphering are performed (such as in the aGW defined in 3GPP RAN 2 for SAE/LTE). The embodiment defines what part of the "secure compressed header format" shall not be encrypted, and what part may be encrypted, as well as the logic used at the sender and at the receiver side.

Ciphering can be performed together with header compression in the same node, reducing overhead of separate sequencing and improving robustness of the key derivation mechanism for deciphering, as characteristics such as robustness against packet losses and reordering gets inherited. The protocol may also include support for payload compression.

This technology can apply within the RoHC framework, to new profiles as extensions of already existing RFC 3095 must be defined, as well as additional channel negotiated parameters for configuration of the cryptographic context, for reordering, etc. New profile-specific packet formats are required, but room is available within the space of unused packet type of RoHC and within the IR packet types. Thus, the proposed solution can be made compatible within the RoHC framework as defined in Carsten Bormann, et al. *RObust Header Compression (ROHC). Framework and four profiles. RTP, UDP, ESP and uncompressed*. IETF RFC 3095, April 2001; and Pelletier, G., Sandlund, K. and L. Jonsson, *The Robust Header Compression (ROHC) Framework*, Internet Draft (work in progress), <draft-ietf-rohc-rfc3095bis-framework-00.txt>, December 2005, so that encrypted RoHC flows could share the same channel as non-encrypted flows.

Establishment of channel parameters related to ciphering is a pre-requisite, either via negotiation, default values, in-band signalling, e.g. during context initialization or via statically provided values. These parameters include items normally present within a cryptographic context: (1) cryptographic transform to use (e.g. AES in f8-mode, HMAC-SHA1); and (2) master key.

Encryption (e.g., ciphering) is applied to the fields that constitute the compressed header, followed by the payload, except for the following fields that must remain unencrypted (e.g., the fields of the header having header compression channel information):

multiplexing identifier for the flow over the header compressed channel (CID).

compressed header format type identification (packet type identifier).

master sequence number (if the ciphering session key is derived using the MSN); the MSN may be compressed.

compression algorithm identifier, when no multiplexing identifier has yet been associated with the secure header-compressed flow (compression profile identifier for initial compressed headers).

Thus, described herein is, e.g., a method of operating a telecommunications network comprising a sending node and a receiving node. The method comprises, for an entering packet at the sending node, encrypting a compressed header of the packet except for fields of the header having header compression channel information, and including an encrypted compressed header in an interface-traversing packet. The method further comprises, for the interface-traversing packet received at the receiving node, obtaining information from the fields of the header having header compression channel information and decrypting the compressed header of the interface-traversing packet.

3.1: Secure Header Compression: Compressor Logic

Figure 30:
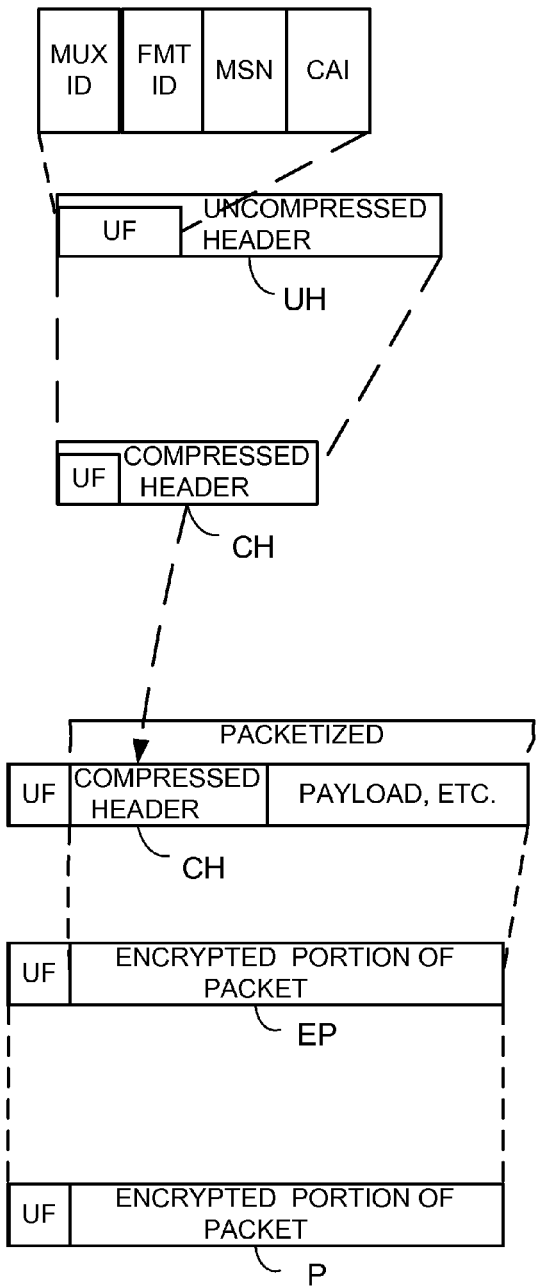
FIG. 30 is a diagrammatic view showing, in correspondence to various acts of FIG. 29, depictions of packet content as a packet evolves in compression and encryption operations.
Figure 29:
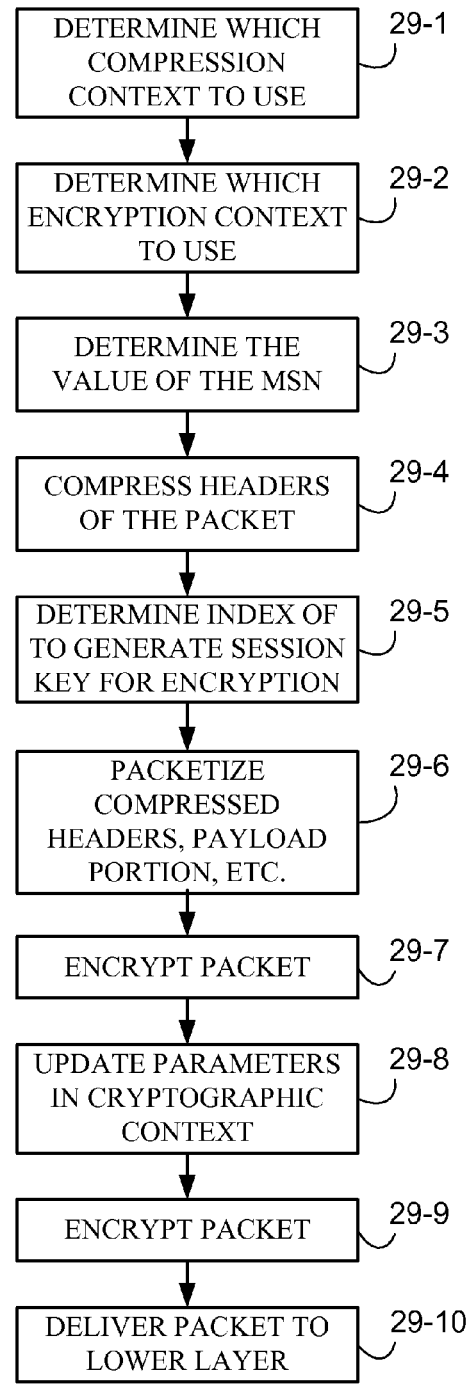
FIG. 29 is a flowchart showing example, non-limiting acts or events that can be performed in an example mode of preparing a packet that has encryption of its compressed header(s).

FIG. 29 is a flowchart showing example, non-limiting acts or events that can be performed in an example mode of preparing a packet that has encryption of its compressed header(s). It will be appreciated that a packet may indeed have more than one header, as differing protocol layers may add their respective headers to form a composite header comprising plural headers of the plural protocols. FIG. 30 shows, in correspondence to various ones of the acts of FIG. 29, depictions of packet content as a packet evolves in the compression and encryption operations.

FIG. 30 shows uncompressed header(s) UH. The uncompressed header(s) UH include the unencryptable fields (UF) listed above: the multiplexing identifier (MUX ID); the compressed header format type identification (FMT ID); master sequence number (MSN); and the compression algorithm identifier (CAI). Collectively these four fields are herein known as the "unencryptable fields" or "UF".

Act 29-1 comprises determining which compression context to use. Similarly, act 29-2 comprises determining what cryptographic context to use. The context determinations of act 29-1 and act 29-2 are based on on-going transactions. The determinations of act 29-1 and act 29-2 may be made collectively.

Act 29-3 comprises determining the value of the master sequence number (MSN), either based on the protocol being header-compressed or from a value maintained locally.

Act 29-4 comprises compressing the headers of the packet. FIG. 30 shows production of a compressed header CH. The compression of act 29-4 may be by any suitable compression technique, such as those described or mentioned herein.

Act 29-5 comprises determining the index of the packet to generate the session key for encryption.

Act 29-6 comprises forming a packet using, e.g., the compressed headers and the encryptable portion of the packet (e.g., the packet payload and any remaining header-compressed channel information e.g. feedback, segmentation, checksum(s), etc). Excluded from the packetization of act 29-6 are the unencryptable fields (UF) listed above: the multiplexing identifier (MUX ID), compressed header format type identification (FMT ID), master sequence number (MSN), and compression algorithm identifier (CAI).

Act 29-7 comprises encrypting the packet formed in act 29-6, e.g., performing encryption on the compressed header CP and the payload of the packet in accordance with the particular ciphering algorithm being utilized. FIG. 30 shows, as a result of the encryption, an encrypted portion EP of the packet. The encryption algorithm can be (for example) similar to e.g. encryption as per Baugher M. et al., *The Secure Real-time Transport Protocol* (*SRTP*), IETF RFC 3711, March 2004. Excluded from the encryption of act 29-7 are the unencryptable fields (UF) mentioned above.

Act 29-8 comprises updating the necessary parameters in the cryptographic context, if applicable.

Act 29-9 comprises packetizing the encrypted portion of the packet by adding the unencryptable fields (UF) listed in act 29-6. These unencryptable fields (UF) must be left unencrypted, but may be compressed, if desired. Accordingly, FIG. 30 shows formation of a final packet P or datagram, essentially ready for delivery to a lower layer. Indeed, act 29-10 comprises delivery of the resulting datagram P to the lower layer (e.g., to a medium access control (MAC) layer used for segmentation and mapping to a correct logical channel and/or transmission queue, e.g., it could be a scheduler for transmission).

Variations in order of the acts of FIG. 29 are possible. For example, the order between act 29-1 and act 29-2 may be inverted. Also, the order between act 29-3, act 29-4, and act 29-6 may be inverted. Further, the order between act 29-8 on the one hand, and act 29-8 and act 29-10 on the other hand, may be inverted.

3.1: Secure Header Compression: Decompressor Logic

Figures 31, 32:
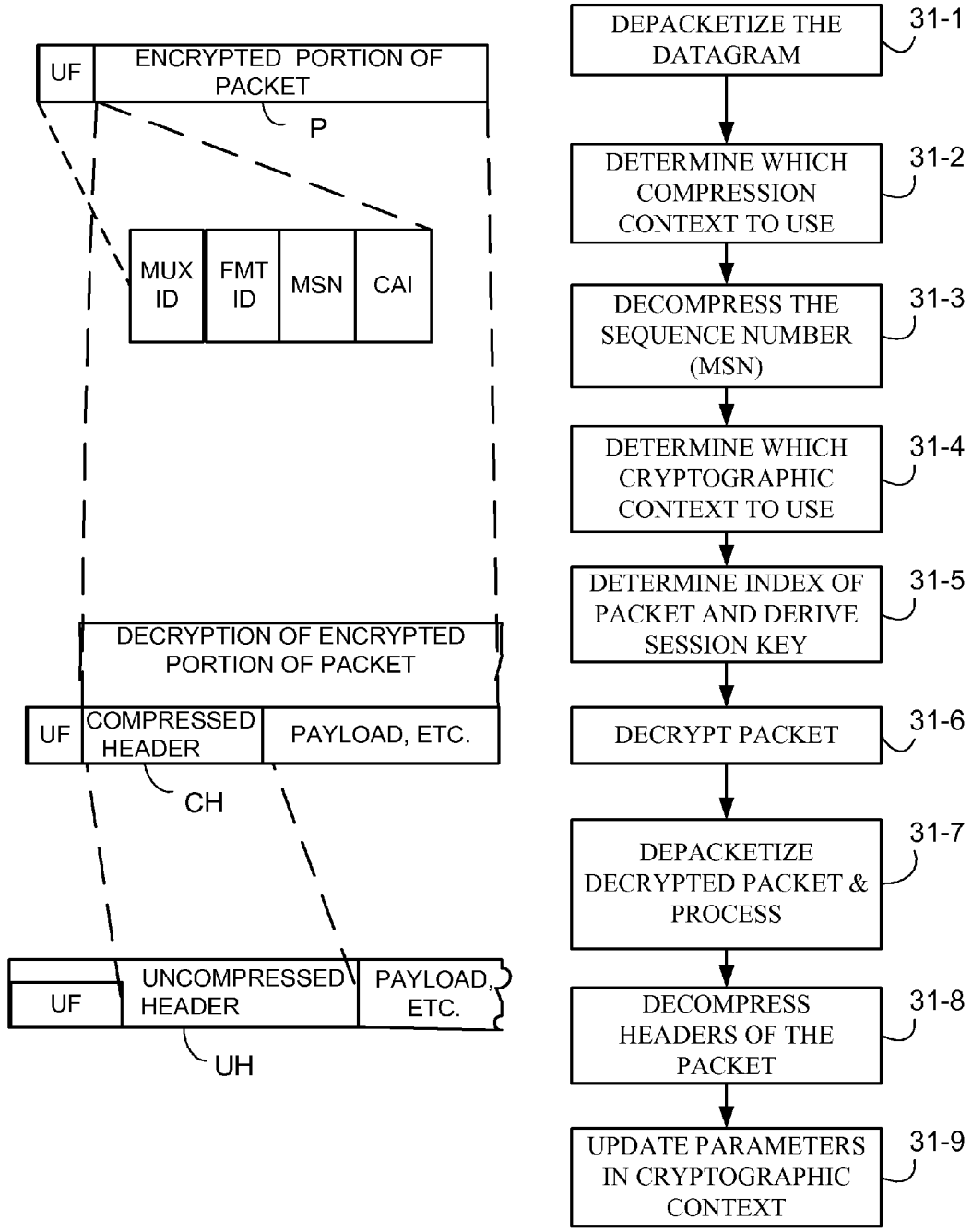
FIG. 31 is a flowchart showing example, non-limiting acts or events that can be performed in an example mode of processing a received packet that has undergone encryption of its compressed header(s).
FIG. 32 is a diagrammatic view showing, in correspondence to various acts of FIG. 29, depictions of packet content as a packet evolves in decryption and decompression operations

FIG. 31 is a flowchart showing example, non-limiting acts or events that can be performed in an example mode of processing a received packet that has undergone encryption of its compressed header(s) (e.g., acts performed at a receiving node). FIG. 32 shows, in correspondence to various ones of the acts of FIG. 31, depictions of packet content as a packet evolves in the decryption and decompression operations Act 31-1 comprises depacketizing the datagram P received from the lower layer, by processing the header-compressed channel information comprising the unencryptable fields (UF), e.g., the multiplexing identifier (MUX ID), compressed header format type identification (FMT ID), master sequence number (MSN), and compression algorithm identifier (CAI).

Act 31-2 comprises determining which compression context to use. Once the compression context is determined, act 31-3 comprises decompressing the MSN.

Act 31-4 comprises determine what cryptographic context to use. The determination of cryptographic context may be coupled with the determination of act 31-2 regarding which header compression context.

Act 31-5 comprises determining the index of the packet and deriving the session key. Derivation of a session key has been explained earlier, and can also be dependent on the cryptographic algorithm. It gets the proper sequencing that reflects the order of the packets process by the encryption as input.

Act 31-6 comprises deciphering (e.g., decrypting) the encrypted portion of the packet in accordance with the particular ciphering algorithm being employed. As mentioned above, the ciphering algorithm can be similar to e.g. decryption as per Baugher M. et al., *The Secure Real-time Transport Protocol* (*SRTP*), IETF RFC 3711, March 2004.

Act 31-7 comprises depacketizing the resulting decrypted datagram, e.g., by processing the remainder of the header-compressed channel information e.g. feedback, segmentation, checksum, etc.

Act 31-8 comprises decompress the entire compressed header part of the decrypted packet, yielding the uncompressed header UH. Act 31-9 comprises updating the necessary parameters in the cryptographic context, if applicable. Act 31-10 comprises delivering the decrypted and decompressed datagram to the upper layer (e.g., the network layer, e.g., the IP protocol stack (e.g., comparable to layer 3 in the OSI model).

Variations in order of the acts of FIG. 31 are possible. For example, the order between act 31-3 and act 31-4 may be inverted.

FIG. 33 shows an example embodiment based on RoHC. The technology described herein makes it possible for "secure profiles" to coexist with other RoHC profiles on the same RoHC channel. This means that the functionality can be turned on/off per header-compressed flow. It however likely requires that new channel parameters be specified, including for RoHC channel negotiation.

3.3: Secure Header Compression: Some Advantages

The secure header compression technology as described above or otherwise encompassed hereby has numerous advantages, a few of which are listed below. A first example advantage is overhead minimization: used in combination as proposed, it also removes the need for lower layers to introduce their own sequencing before an independent encryption layer. This reduces the overhead at lower layers.

A second example advantage is impact on existing standards and architectures. In addition, expanding the functionality of header compression as suggested here does not preclude lower layers to have their own functionality for ciphering and reordering. Used in combination as proposed, it allows lower layers to turn off their sequencing and in-order delivery mechanisms before an independent encryption layer. This reduces the total overhead. In other words, this is not a layer violation or cross-layer integration. However, new compression algorithms (e.g. RoHC profiles) need not be defined and standardized.

A third example advantage is applicability to header compression in general. This is particularly applicable to most ROHC profiles, including—but not limited to—the ROHC RTP (0x0001), UDP (0x0002), IP (0x0004), ESP (0x0003), TCP (0x0006), UDP-Lite (0x0008), RTP/UDP-Lite (0x0007) header compression profiles. It is also especially relevant, but not limited to, ciphering and encryption algorithms such as stream ciphers that allows e.g., using a bit mask, that only special bits are unencrypted/encrypted. Examples of such stream ciphers include A5, GEA, UEA and AES. Other ciphering and encryption algorithms of relevance are those that make use of sequencing information to derive parameters necessary to (de)ciphering.

4.0: Sharing of Sequence Numbers: Overview

In one of its aspects, the shared transaction of the technology is shared information, e.g. a sharing of a sequence number. In other words, in this aspect of the technology, one functional layer uses sequencing information from another functional layer. Basically, sequencing information used by any of ciphering and/or header compression and/or payload compression and/or signalling compression is derived from another process, any other one of ciphering and/or header compression and/or payload compression and/or signalling compression.

Header compression normally uses some form of sequence number, sometimes called a Master Sequence Number (MSN), based on which other fields are normally compressed by establishing functions based on their change pattern with respect to the sequence number. This sequence number is either derived from protocol field(s) being compressed, or it can be generated locally by the compressor.

Ciphering (e.g., encryption) normally uses some form of sequencing information, based on which a session key is derived in conjunction with a cryptographic context.

In a first mode of sequence number sharing, the header compressor first compresses the headers of the packet, and hands over its sequence number to the ciphering process. The ciphering process uses this sequence number to derive a session key, and processes the packet with encryption.

In a second mode of sequence number sharing, the encryption (ciphering) function can make available the sequence number that it will use next (in its encryption operations) for the header compressor. The header compressor uses this sequence number as its MSN and compresses the packet, and hands the compressed packet to the ciphering process. The encryption process then uses this same sequence number to derive a session key, and processes with encryption. The sequencing information is carried within the ciphering protocol, if applicable.

In other words, in the second mode, sequencing (e.g., a sequence number) is created by the encryption function, and made available to the header compression function. The (de)compression function uses this sequencing as its Master Sequence Number (MSN) when (de)compressing.

Typically encryption and compression are regarded as separate processes. Traditionally, encryption is performed either between IP end hosts (leaving most of the headers not-compressible), applications (undetectable, so intermediate systems cannot turn-on/off their own encryption) or between transmitter and receivers over the physical medium (localized to adjacent nodes, unless ordering can be guaranteed).

Figure 34:
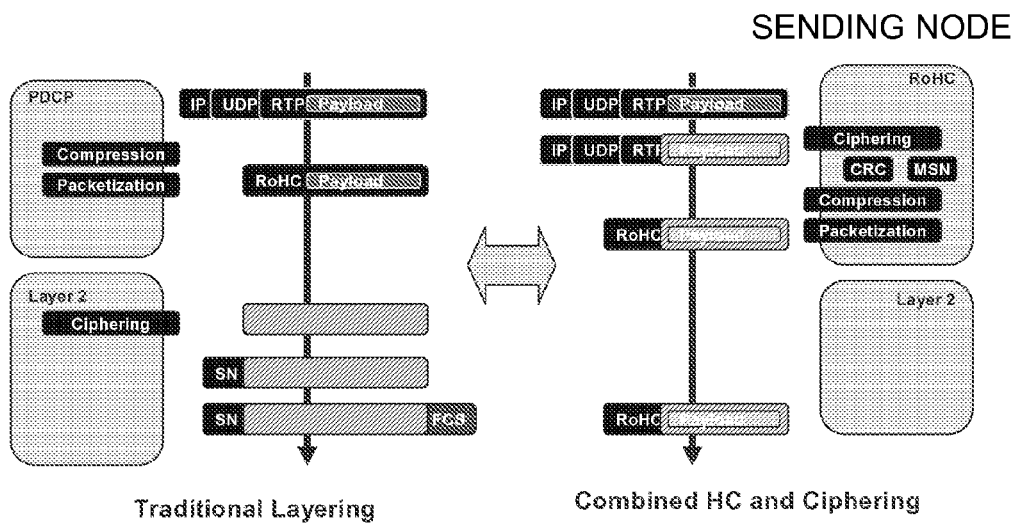
FIG. 34 is a diagrammatic view contrasting a traditional separation of encryption and compression with combined or merged compression and encryption processes.

In either mode of sequence number sharing described herein, the ciphering adaptation layer can be viewed as being header compression. FIG. 34 contrasts the traditional separation of encryption and compression (shown on the left of FIG. 34) with the sequence number sharing and combined or merged compression and encryption processes as described herein (shown on the right of FIG. 34). Basically, ciphering of the payload is performed in conjunction with header compression. The header compression Master Sequence Number (MSN), whether ultimately obtained from the compression function or the encryption function, is used to derive the session key from the cryptographic context. The encryption function uses the sequence number MSN to implicitly derive the session key from the cryptographic context. Ciphering is applied to the part of the packet that corresponds to the payload, using header compression sequencing. The same sequence number MSN is used by the compression process for compressing the header(s), as illustrated by the RoHC compression of FIG. 34.

In the sequence number sharing aspect, ciphering is efficiently combined with compression, with ciphering being performed on the payload of the packet being compressed using the Master Sequence Number (MSN) used for compression for session key derivation, à la SRTP. The encryption benefits of the robustness characteristics of the encoding used for the MSN in terms of losses and reordering with respect to its own synchronization requirements.

An example apparatus comprises two corresponding nodes (adjacent or not) where compression and ciphering is performed (such as the Access Gateway defined in 3GPP RAN 2 for SAE/LTE). Cryptographic transforms and key derivation algorithms (such as those described in Baugher M. et al., *The Secure Real-time Transport Protocol (SRTP)*, IETF RFC 3711, March 2004) uses the Master Sequence Number (MSN) from the compression algorithm (e.g. ROHC) to encrypt and decrypt the payload. Doing so means that the robustness of the cryptographic session key derivation algorithm additionally inherits the robustness characteristics of the MSN against lost packets and reordering between the compression/ciphering endpoints.

Thus, ciphering can be performed together with header compression in the same node, in particular with RoHC, thereby reducing overhead of having separate sequencing and improving robustness of the key derivation mechanism for deciphering.

Figure 35:
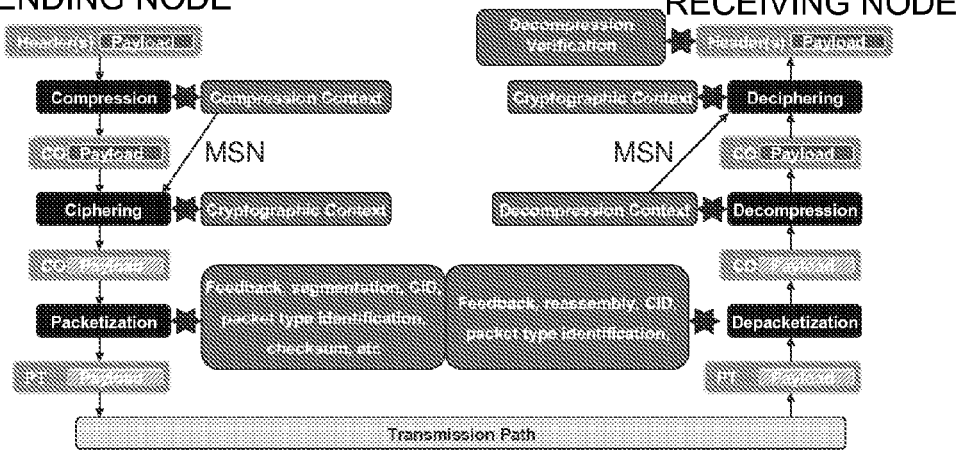
FIG. 35 is a diagrammatic view showing a sequence of acts or events performed with respect to both a sending node and a receiving node having combined or merged compression and encryption processes wherein sequence numbers are shared by the compression and encryption processes.

Additional external negotiation mechanisms may exist for configuration of the ciphering process, profiles already defined in RFC3095 as well as other derivate profiles (provided that there is no ESP extension header) can be used without modifications. A possible improvement in case of reordering is to disable some of the smallest packet formats 4.1: Sharing of Sequence Numbers: Example Implementation FIG. 35 shows, for an example, non-limiting implementation, basic, representative acts or events performed with respect to both a sending node and a receiving node having combined or merged compression and encryption processes wherein sequence numbers are shared by the compression and encryption processes. The series of acts illustrated in FIG. 35 is applicable either to the first mode of sharing of sequence numbers (in which the sequence number MSN is chosen or selected by the compression process), or the second mode of sharing of sequence numbers (in which the sequence number MSN is chosen or selected by the encryption process). FIG. 36 and FIG. 37 illustrate, in flowchart form, the acts of the sending node and receiving node, respectively.

FIG. 36 thus describes basic acts performed or events conducted by the compressor logic of the sending node. Act 36-1 (see FIG. 36) comprises determining which compression context to use; act 36-2 comprises determining what cryptographic context to use. As indication in previous aspects, the determinations of compression context and cryptographic contexts can be coupled.

Act 36-3 comprises determine the value of the MSN. In the first mode of this aspect, the sequence number MSN is maintained or generated by the compression process (e.g., either based on the protocol being header-compressed or from a value maintained locally). In the second mode, the sequence number MSN is obtained from the encryption process as the next number it will use for sequencing in the encryption operation.

Act 36-4 comprises actual compressing of the headers of the packet. As indicated previously, a packet may have plural header(s), such as the RTP header, the DP header, and the IP header, all of which can constitute a packet header(s) as illustrated in FIG. 398-1.

Act 36-5 comprises determining the index of the packet using the uncompressed representation of the MSN (which was used to compress the headers of the packet) and using a key derivation algorithm in conjunction with e.g. a rollover counter, the highest MSN in the cryptographic context, and the uncompressed representation of the MSN used to compress the headers of the packet.

Act 36-6 comprises encrypting the payload of the packet in accordance with the particularly ciphering algorithm which happens to be employed. This becomes the encrypted portion of the packet. The algorithm can be similar to e.g. encryption as per Baugher M. et al., *The Secure Real-time Transport Protocol (SRTP)*, IETF RFC 3711, March 2004.

Act 36-7 comprises updating the necessary parameters in the cryptographic context, if applicable.

Act 36-8 comprises packetizing the compressed headers and the encrypted portion of the packet with the remaining header-compressed channel information e.g. feedback, segmentation, context identification, checksum(s), etc.

Act 36-9 comprises deliver the resulting datagram to the lower layer (e.g., a medium access control (MAC) layer or RLC layer)

Variations in order of the acts of FIG. 31 are possible. For example, the order between Act 36-1 and Act 36-2 may be inverted. Also, the order between act 36-4 on the one hand, and act 36-5, act 36-6, and act 36-7, on the other hand, may be inverted.

FIG. 37 describes basic acts performed or events conducted by the decompressor logic of the receiving node. Act 37-1 (see FIG. 37) comprises depacketizing the datagram received from the lower layer, by processing the header-compressed channel information e.g. feedback, segmentation, context identification, checksum, etc.

Act 37-2 comprises determining which compression context to use. Act 37-3 comprises determine what cryptographic context to use (once again, the determinations of header compression context and cryptographic context may be coupled).

Act 37-4 comprises decompressing the sequence number MSN. Act 37-5 comprises decompressing the entire compressed header part.

Act 37-6 comprises determine the index of the packet using the uncompressed representation of the MSN used to decompress the headers of the packet, using a key derivation algorithm in conjunction with e.g. a rollover counter, the highest MSN in the cryptographic context, and the uncompressed representation of the MSN used to decompress the headers of the packet.

Act 37-7 comprises deciphering (decrypting) the encrypted portion of the packet as per the ciphering algorithm. As mentioned previously, the encryption/decryption can be similar to, e.g. decryption as per Baugher M. et al., *The Secure Real-time Transport Protocol (SRTP)*, IETF RFC 3711, March 2004.

Act 37-8 comprises updating the necessary parameters in the cryptographic context, if applicable. Act 37-9 comprises delivering the datagram to upper layer.

Variations in order of the acts of FIG. 32 are possible. For example, the order between Act 37-2 and Act 37-3 may be inverted. Also, the order between act 37-5 on the one hand, and act 37-5, act 37-6, and act 37-7, on the other hand, may be inverted.

4.3: Sharing of Sequence Numbers: Some Advantages

The sequence number sharing techniques, methods, embodiments, and systems described herein have numerous merits, including but not limited to (1) minimization of overhead; (2) low impact on existing standards and architectures; (3) mutual benefits and improved robustness for the cryptographic context; and (4) applicability to header compression in general.

A first example advantage is minimization of overhead. The sequence number sharing technique can be applied to expand the functionality offered by Robust Header Compression, to include the provision of sequencing information to the ciphering function. This may be especially useful when combined together, using cryptographic transforms that do not contribute to expansion of the payload.

A second example advantage is low impact on existing standards and architectures. The solutions also have very low impact on current architectures and target systems, in particular the ciphering adaptation layer within header compression embodiment does not require any modifications to existing header compression algorithms or to their specifications. What is required in only that negotiation (possibly out-of-band) of the usage of (and the parameters for) ciphering be performed prior to activating ciphering based on the compression MSN. In addition, expanding the functionality of header compression as described herein does not preclude lower layers to have their own functionality for ciphering and reordering. Used in combination as proposed, it allows lower layers to turn off their sequencing and in-order delivery mechanisms before an independent encryption layer. This reduces the total overhead. In other words, this is not a layer violation or cross-layer integration.

A third example advantage is mutual benefits and improved robustness for the cryptographic context. The ciphering function benefits from the robustness characteristics of the header compression algorithm with respect to sequencing information, and thus lowers the probabilities that the cryptographic context loses synchronization with respect to sequencing. Would this happen, resynchronization will occur from within the recovery mechanisms of the header compression algorithm. The ciphering function cannot contribute to context damage for the header compression algorithm, as it only processes the non-compressed part of the packet. In this respect, the ciphering and the header compression functions cannot negatively impact each other, while header compression takes care of the sequencing robustness on the behalf of the ciphering algorithm and saves overhead.

A fourth example advantage is applicability to header compression in general. Such applicable is salient, for example, to most ROHC profiles, including—but not limited to—the ROHC RTP (0x0001), UDP (0x0002), IP (0x0004), ESP (0x0003), TCP (0x0006), UDP-Lite (0x0008), RTP/UDP-Lite (0x0007) header compression profiles. It is also especially relevant, but not limited to, ciphering and encryption algorithms such as stream ciphers that allows e.g., using a bit mask, that only special bits are unencrypted/encrypted.

Examples of such stream ciphers include A5, GEA, UEA and AES. Other ciphering and encryption algorithms of relevance are those that make use of sequencing information to derive parameters necessary to (de)ciphering.

In accordance with the sequence number sharing technique, ciphering is applied to a packet data in combination with a compression algorithm. The ciphering uses cryptographic transforms based e.g. on an additive stream cipher for encryption that makes use of an index for session key derivation. The index used is the Master Sequence Number (MSN) of the compression protocol.

The sequencing information used by any of ciphering and/or header compression and/or payload compression and/or signalling compression is derived from another process, any other one of ciphering and/or header compression and/or payload compression and/or signalling compression.

Any of ciphering and/or header compression and/or payload compression and/or signalling compression uses the sequencing information from another functional process being any of ciphering and/or header compression and/or payload compression and/or signalling compression.

In particular, when any of ciphering and/or payload compression and/or signalling compression uses the sequencing information comes from the header compression function.

The sequencing is created by the ciphering process, and made available to the header compression algorithm. The compression uses this as its Master Sequence Number (MSN) when compressing.

The foregoing is applicable, e.g., to the specific case where the compression algorithm is implemented according to a Robust Header Compression (ROHC) profile, including—but not limited to—the ROHC RTP (0x0001), UDP (0x0002), IP (0x0004), ESP (0x0003), TCP (0x0006), UDP-Lite (0x0008), RTP/UDP-Lite (0x0007) header compression profiles.

The foregoing is applicable, e.g., to specific cases when the header compressor and/or decompressor are/is implemented according to any other header compression schemes in general.

The foregoing is applicable, e.g., to the specific case where the ciphering and encryption algorithms are stream ciphers, including but not limited to A5, GEA, UEA and AES. Other ciphering and encryption algorithms that make use of sequencing information to derive parameters necessary to (de)ciphering are also within scope.

The foregoing is applicable, e.g., to other compression algorithms, such as signalling compression such as SigComp, Payload Compression algorithms (such as those defined in Pereira, R., *IP Payload Compression Using DEFLATE*, IETF RFC 2394, December 1998; and Friend, R. et R. Monsour, *IPPayload Compression Using LZS*, IETF RFC 2395, December 1998) or any other operations that require sequencing and checksums, for which this information can be shared with other algorithms and which originates and terminates in the same nodes.

The foregoing is applicable, e.g., to aGW currently being defined in 3GPP RAN 2 standardization working group as part of the SAE/LTE work.

The techniques, methods, embodiments, and systems described herein have numerous merits, including but not limited to (1) minimization of overhead; (2) low impact on existing standards and architectures; (3) mutual benefits and improved robustness for the cryptographic context; and (4) applicability to header compression in general.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus comprising a node of a telecommunications network comprising:
   a computer configured to execute a first function and a second function;
   the first function comprising a computer-implemented data compression function and configured to perform a first operation on a first portion of a packet handled by the node, the first operation comprising a data compression operation;
   a second function comprising a computer-implemented encryption function and configured to perform a second operation on a second portion of the packet, the second operation comprising an encryption operation;
   wherein the first function and the second function are configured to employ a shared transaction for operating on the packet whereby, by virtue of the shared transaction, after performance of the first operation and the second operation, the packet has less overhead attributable to the first function and the second function than if the shared transaction had not been employed in performance of the first operation and the second operation;
   wherein the shared transaction comprises shared information originated by one of the first function and the second function and employed by another of the first function and the second function, and
   wherein the shared information comprises a sequence number that is used by the first function as a master sequence number (MSN) and that is used by the second function to encrypt at least a portion of the packet.

2. The apparatus of claim 1, wherein the node is an access gateway of a System Architecture Evolution/Long Term Evolution (SAE/LTE) telecommunications network.

3. The apparatus of claim 1, wherein the node is an enhanced Node B (eNB) of a System Architecture Evolution/Long Term Evolution (SAE/LTE) telecommunications network.

4. The apparatus of claim 1, wherein the node comprise plural physical node, with the first function being located in first physical node and the second function being located in a second physical node.

5. The apparatus of claim 1, wherein the first function, the second function, and the shared transaction are performed within a same model layer.

6. The apparatus of claim 5, wherein the first function, the second function, and the shared transaction are performed by a link layer protocol.

7. The apparatus of claim 1, wherein the sequence number is originated by the compression function.

8. The apparatus of claim 7, wherein the shared transaction further comprises determination of a checksum over at least a part of the first portion of the packet and over at least a part of the second portion of the packet, the checksum having been determined whereby the checksum is used to validate performance of both the first operation and the second operation.

9. The apparatus of claim 8, wherein the first portion of the packet is a packet header, wherein the second portion of the packet is a packet payload, and wherein the checksum is determined over at least part of the header of the packet and over at least a part of the payload of the packet.

10. The apparatus of claim 8, wherein the first portion of the packet is a packet header, wherein the second portion of the packet is a packet payload, and wherein the checksum is determined over at least part of the header of the packet and over at least a part of the payload of the packet.

11. The apparatus of claim 1, wherein the sequence number is originated by the encryption function.

12. The apparatus of claim 11, wherein the shared transaction further comprises determination of a checksum over at least a part of the first portion of the packet and over at least a part of the second portion of the packet, the checksum having been determined whereby the checksum is used to validate performance of both the first operation and the second operation.

13. The apparatus of claim 1, wherein the shared transaction comprises the second function also operating on the first portion of the packet.

14. The apparatus of claim 13, wherein encryption function encrypts at least a portion of a header of the packet.

15. The apparatus of claim 14, wherein encryption function does not encrypt compression channel identifiers of the header.

16. The apparatus of claim 1, wherein the shared transaction further comprises determination of a checksum over at least a part of the first portion of the packet, and wherein the part of the first portion of the packet over which the checksum is determined comprises a parameter utilized by the second function in operating on the second portion of the packet.

17. The apparatus of claim 16, wherein the first portion of the packet is a packet header, wherein the second portion of the packet is a packet payload, wherein the checksum is determined over at least part of the header of the packet, and wherein a parameter utilized by the second function in operating on the second portion of the packet is a sequence number to derive a session key for its cryptographic context.

18. The apparatus of claim 1, wherein the compression function is configured to compress at least one of the following: a header of the packet, a payload of the packet, and a signal associated with the packet.

19. The apparatus of claim 1, wherein less overhead attributable to the first function and the second function results in a smaller size of a portion of the packet covered by the first operation and the second operation than if the shared transaction had not been employed in performance of the first operation and the second operation.

20. The apparatus of claim 1, wherein the sequence number is part of an uncompressed header.

21. A method of operating a node of a telecommunications network comprising:
using a computer-implemented first function to perform a first operation on a first portion of a packet handled by the node, the first function comprising a data compression function and the first operation comprising a data compression operation;
using a computer-implemented second function to perform a second operation on a second portion of the packet, the second operation comprising an encryption function and the second operation comprising an encryption operation;
using a shared transaction for operating on the packet, and a shared information being employed in both the first operation and the second operation whereby, by virtue of the shared transaction, the packet has less overhead attributable to the first function and the second function than if the shared transaction had not been employed in performance of the first operation and the second operation;
wherein the shared transaction comprises shared information originated by one of the first function and the second function and employed by another of the first function and the second function; and
wherein the shared information comprises a sequence number that is used by the first function as a master sequence number (MSN) and that is used by the second function to encrypt at least a portion of the packet.

22. The method of claim 21, wherein the node is an access gateway of a System Architecture Evolution/Long Term Evolution (SAE/LTE) telecommunications network.

23. The method of claim 21, wherein the node is an enhanced Node B (eNB) of a System Architecture Evolution/Long Term Evolution (SAE/LTE) telecommunications network.

24. The method of claim 21, wherein the node comprises plural physical nodes, the method further comprising locating the first function being located in a first physical node and locating the second function in a second physical node.

25. The method of claim 21, further comprising using a same model layer protocol to perform the first function, the second function, and the shared transaction.

26. The method of claim 25, further comprising using a link layer protocol to perform the first function, the second function, and the shared transaction.

27. The method of claim 21, wherein the sequence number is also used by the encryption function to derive a session key which is used by the encryption function for encrypting at least a portion of the packet.

28. The method of claim 27, wherein the shared transaction comprises determination of a checksum over at least a part of the first portion of the packet and over at least a part of the second portion of the packet, the checksum having been determined whereby the checksum is used to validate performance of both the first operation and the second operation.

29. The method of claim 28, wherein the first portion of the packet is a packet header, wherein the second portion of the packet is a packet payload, and wherein the checksum is determined over at least part of the header of the packet and over at least a part of the payload of the packet.

30. The method of claim 21, wherein the sequence number is used to derive a session key for use by the encryption function for encrypting at least a portion of the packet.

31. The method of claim 21, wherein the shared transaction comprises the second function also operating on the first portion of the packet.

32. The method of claim 31, wherein the first function is a data compression function and the second function is an encryption function, and wherein encryption function encrypts at least a portion of a header of the packet.

33. The method of claim 32, wherein encryption function encrypts does not encrypt compression channel identifiers of the header.

34. The method of claim 21, wherein the shared transaction further comprises determination of a checksum over at least a part of the first portion of the packet, and wherein the part of the first portion of the packet over which the checksum is determined comprises a parameter utilized by the second function in operating on the second portion of the packet.

35. The method of claim 34, wherein the first portion of the packet is a packet header, wherein the second portion of the packet is a packet payload, wherein the checksum is determined over at least part of the header of the packet, and wherein a parameter utilized by the second function in operating on the second portion of the packet is a sequence number to derive a session key for its cryptographic context.

36. The method of claim 21, wherein the compression function is configured to compress at least one of the following: a header of the packet, a payload of the packet, and a signal associated with the packet.

37. The method of claim 21, wherein less overhead attributable to the first function and the second function results in a smaller size of a portion of the packet covered by the first operation and the second operation than if the shared transaction had not been employed in performance of the first operation and the second operation.

38. The method of claim 21, wherein the method comprises the compression operation originating the sequence number as being part of an uncompressed header or being generated by the compression operation.

* * * * *

UNITED STATES PATENT AND TRADEMARK OFFICE
CERTIFICATE OF CORRECTION

PATENT NO. : 8,189,586 B2  
APPLICATION NO. : 11/733558  
DATED : May 29, 2012  
INVENTOR(S) : Pelletier et al.

Page 1 of 2

Figure 8:
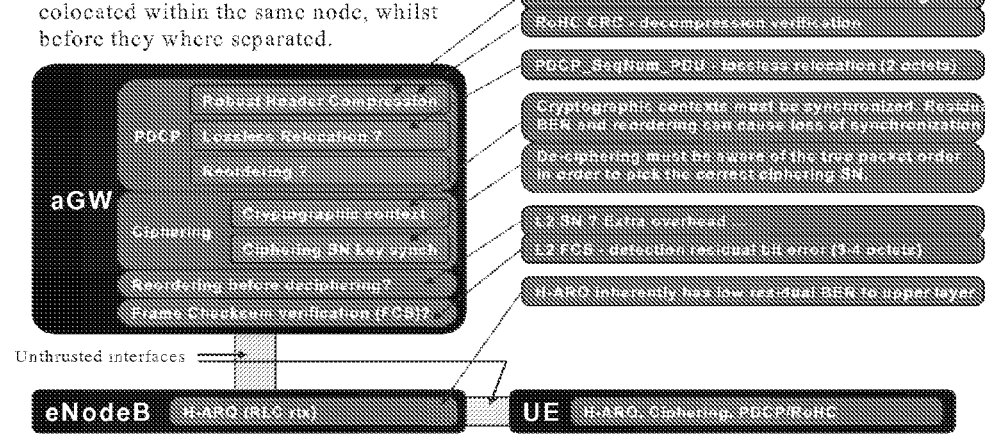
FIG. 8 is a diagrammatic view illustrating problematic layering overhead in a telecommunications network.

It is certified that error appears in the above-identified patent and that said Letters Patent is hereby corrected as shown below:

In Fig. 8, Sheet 6 of 28, delete "unthrusted interfaces" and insert -- untrusted interfaces --, therefor.

In Fig. 9A, Sheet 7 of 28, delete "  " and insert -- --, therefor.

In Fig. 9B, Sheet 8 of 28, delete "  " and insert -- --, therefor.

In Fig. 12, Sheet 11 of 28, delete " 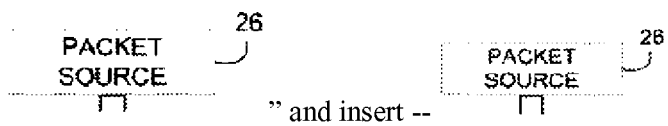 " and insert -- --, therefor.

In Fig. 14, Sheet 13 of 28, delete "  " and insert -- --, therefor.

In Fig. 15, Sheet 14 of 28, delete " 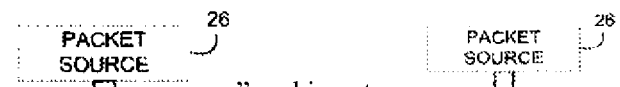 " and insert -- --, therefor.

In Fig. 16, Sheet 15 of 28, delete "  " and insert -- --, therefor.

In Fig. 29, Sheet 23 of 28, for Tag "29-5", in Line 1, delete "OF" and insert -- OF PACKET --, therefor.

Signed and Sealed this  
Twenty-seventh Day of November, 2012

David J. Kappos  
*Director of the United States Patent and Trademark Office*

CERTIFICATE OF CORRECTION (continued)
U.S. Pat. No. 8,189,586 B2

In Fig. 36, Sheet 27 of 28, for Tag "36-5", in Line 1, delete "OF" and insert -- OF PACKET --, therefor.

In Column 3, Line 14, after "compression" delete "is".

In Column 6, Line 56, delete "Telecommunications" and insert -- Telecommunications System --, therefor.

In Column 7, Line 1, delete "Telecommunications" and insert -- Telecommunications System --, therefor.

In Column 19, Line 63, delete "need" insert -- need to --, therefor.

In Column 22, Line 17, delete "19-1-a)." and insert -- 19-1-a. --, therefor.

In Column 23, Line 62, delete "checksum." and insert -- checksum). --, therefor.

In Column 24, Line 66, delete "to" and insert -- to be --, therefor.

In Column 25, Line 6, delete "payload." and insert -- payload). --, therefor.

In Column 30, Line 40, delete "stack (e.g.," and insert -- stack, e.g., --, therefor.

In Column 31, Line 64, delete "nodes," and insert -- nodes), --, therefor.

In Column 33, Line 15, delete "DP" and insert -- UDP --, therefor.

In Column 36, Lines 64-65, in Claim 4, delete "comprise plural physical node," and insert -- comprises plural physical nodes, --, therefor.

In Column 39, Lines 1-3, Claim 32, after "claim 31," delete "wherein the first function is a data compression function and the second function is an encryption function, and".